(12) United States Patent
Wiggins et al.

(10) Patent No.: US 12,528,058 B2
(45) Date of Patent: Jan. 20, 2026

(54) CONTAINER FOR LIQUID AND METHOD ASSOCIATED THEREWITH

(71) Applicant: Spritz, Inc., Brooklyn, NY (US)

(72) Inventors: Mark Wiggins, Brooklyn, NY (US); John Thorp, Brooklyn, NY (US); JonPaul Turner, Brooklyn, NY (US)

(73) Assignee: Spritz, Inc., Brooklyn, NY (US)

( * ) Notice: Subject to any disclaimer, the term of this patent is extended or adjusted under 35 U.S.C. 154(b) by 241 days.

(21) Appl. No.: 18/186,585

(22) Filed: Mar. 20, 2023

(65) Prior Publication Data

US 2023/0302417 A1    Sep. 28, 2023

Related U.S. Application Data

(60) Provisional application No. 63/323,441, filed on Mar. 24, 2022.

(51) Int. Cl.
| | | |
|---|---|---|
| *B01F 23/2361* | (2022.01) | |
| *B01F 23/237* | (2022.01) | |
| *B01F 35/71* | (2022.01) | |
| *B65D 81/32* | (2006.01) | |
| *B65D 85/73* | (2006.01) | |
| *B01F 101/14* | (2022.01) | |

(52) U.S. Cl.
CPC .......... *B01F 23/23611* (2022.01); *B01F 23/237621* (2022.01); *B01F 35/71805* (2022.01); *B65D 81/3222* (2013.01); *B65D 85/73* (2013.01); *B01F 2101/14* (2022.01)

(58) Field of Classification Search
None
See application file for complete search history.

(56) References Cited

U.S. PATENT DOCUMENTS

| | | | | |
|---|---|---|---|---|
| 2,172,035 | A * | 9/1939 | Roth | B01F 23/23611 |
| | | | | 261/DIG. 7 |
| 2,936,100 | A * | 5/1960 | Chatten | B67D 1/0412 |
| | | | | 222/399 |
| 3,648,893 | A * | 3/1972 | Whiting | F16K 1/307 |
| | | | | 222/397 |
| 4,219,040 | A * | 8/1980 | Fallon | F16K 17/162 |
| | | | | 137/68.24 |
| 4,479,520 | A * | 10/1984 | Holben | F17C 13/04 |
| | | | | 285/104 |

(Continued)

FOREIGN PATENT DOCUMENTS

| | | | | |
|---|---|---|---|---|
| EP | 0186709 A1 * | 9/1986 | | |
| FR | 2804672 A3 * | 8/2001 | | B67D 1/0418 |

(Continued)

*Primary Examiner* — Viren A Thakur
(74) *Attorney, Agent, or Firm* — Greenberg Traurig, LLP

(57) ABSTRACT

A method includes obtaining a cartridge having a first fluid within an interior of the cartridge, where the cartridge includes a valve; obtaining a container having a second fluid within an interior of the container; obtaining a pressurizer; installing the cartridge within the pressurizer; installing the pressurizer within a container opening at a top end of the container; and opening the valve in the cartridge, to flow the first fluid within the interior of the cartridge through a first flow path in the valve, and a second flow path in the pressurizer into the second fluid in the container.

29 Claims, 12 Drawing Sheets

(56) References Cited

U.S. PATENT DOCUMENTS

| | | | |
|---|---|---|---|
| 4,526,730 A * | 7/1985 | Cochran | B01F 23/23611 |
| | | | 426/477 |
| 4,867,209 A * | 9/1989 | Santoiemmo | B01F 23/23611 |
| | | | 261/DIG. 7 |
| 5,022,565 A * | 6/1991 | Sturman | B67D 1/0418 |
| | | | 222/399 |
| 7,131,558 B2 | 11/2006 | De La Guardia | |
| 7,713,483 B2 | 5/2010 | Maiden | |
| 7,874,325 B2 | 1/2011 | Tyler | |
| 7,909,160 B2 | 3/2011 | Patterson et al. | |
| 7,913,869 B2 | 3/2011 | Cuocolo, Jr. | |
| 7,931,166 B2 | 4/2011 | Cuocolo, Jr. | |
| 7,951,109 B2 | 5/2011 | Anderson | |
| 8,025,170 B1 | 9/2011 | Richard | |
| 8,182,683 B1 | 5/2012 | Allen | |
| 8,245,870 B2 | 8/2012 | McKinney et al. | |
| 8,297,456 B1 | 10/2012 | Anderson | |
| 8,313,644 B2 | 11/2012 | Harris et al. | |
| 8,323,490 B1 | 12/2012 | Wright et al. | |
| 8,408,389 B1 | 4/2013 | Anderson | |
| 8,479,639 B2 | 7/2013 | Levin | |
| 8,584,877 B2 | 11/2013 | Heiberger | |
| 8,641,016 B2 | 2/2014 | Tatera | |
| 8,695,836 B1 | 4/2014 | Mukai | |
| 8,701,906 B1 | 4/2014 | Anderson | |
| 8,844,761 B2 | 9/2014 | Zabaleta et al. | |
| 8,857,665 B2 | 10/2014 | Owoc | |
| 9,027,769 B2 | 5/2015 | Willows et al. | |
| 9,034,404 B2 | 5/2015 | Aibe et al. | |
| 9,051,167 B2 | 6/2015 | Burge et al. | |
| 9,085,452 B2 | 7/2015 | Hoffmann | |
| 9,120,604 B2 | 9/2015 | Lohn | |
| 9,126,731 B2 | 9/2015 | Chen | |
| 9,168,495 B2 | 10/2015 | Connors | |
| 9,173,430 B1 | 11/2015 | Harvell | |
| 9,221,585 B1 | 12/2015 | Wang | |
| 9,227,161 B2 | 1/2016 | Bormes et al. | |
| 9,227,210 B2 | 1/2016 | Chang | |
| 9,242,773 B1 | 1/2016 | Anderson | |
| 9,289,731 B2 | 3/2016 | Tatera | |
| 9,290,309 B1 | 3/2016 | Pabon | |
| 9,327,876 B2 | 5/2016 | Garcia | |
| 9,456,710 B2 | 10/2016 | Blain et al. | |
| 9,499,316 B2 | 11/2016 | Hasegawa | |
| 9,592,478 B2 | 3/2017 | Connors | |
| 9,624,006 B2 | 4/2017 | Savino | |
| 9,636,696 B2 | 5/2017 | Hextall | |
| 9,637,290 B2 | 5/2017 | Jeon | |
| 9,663,264 B2 | 5/2017 | Springer | |
| 9,687,796 B2 | 6/2017 | Hoare et al. | |
| 9,701,453 B2 | 7/2017 | Moradi | |
| 9,701,527 B2 | 7/2017 | Tansey | |
| 9,724,629 B2 | 8/2017 | Lane | |
| 9,731,954 B2 | 8/2017 | Blackburn | |
| 9,770,694 B2 | 9/2017 | Psilander | |
| 9,771,189 B2 | 9/2017 | Miksovsky et al. | |
| 9,776,777 B2 | 10/2017 | Gorbold et al. | |
| 9,902,537 B2 | 2/2018 | Abou-Odah et al. | |
| 9,919,860 B2 | 3/2018 | Dabah et al. | |
| 10,023,365 B2 | 7/2018 | Choi et al. | |
| 10,183,260 B2 | 1/2019 | Wilder et al. | |
| 10,196,187 B2 | 2/2019 | Hingorani | |
| 10,201,785 B2 | 2/2019 | Cohen et al. | |
| 10,214,336 B2 | 2/2019 | Perrulli et al. | |
| 10,220,990 B2 | 3/2019 | Cote, Sr. et al. | |
| 10,280,388 B2 | 5/2019 | Pellaud et al. | |
| 10,329,134 B2 | 6/2019 | Olson et al. | |
| 10,336,597 B2 | 7/2019 | Griscik et al. | |
| 10,343,885 B2 | 7/2019 | Novak et al. | |
| 10,370,237 B2 | 8/2019 | Blackburn | |
| 10,384,839 B2 | 8/2019 | Yamaguchi | |
| 10,391,452 B2 | 8/2019 | Barchet | |
| 10,406,488 B2 | 9/2019 | Song et al. | |
| 10,457,450 B2 | 10/2019 | Rios | |
| 10,463,056 B2 | 11/2019 | Singer | |
| 10,471,400 B2 | 11/2019 | Yueh | |
| 10,479,570 B2 | 11/2019 | Streisfeld | |
| 10,588,447 B1 | 3/2020 | Singer | |
| 10,603,680 B2 | 3/2020 | Laikind | |
| 10,653,255 B1 | 5/2020 | Trawinski | |
| 10,654,623 B2 | 5/2020 | Circosta et al. | |
| 10,654,700 B2 | 5/2020 | Hecht | |
| 10,661,949 B2 | 5/2020 | Hein et al. | |
| 10,668,437 B2 | 6/2020 | Asis | |
| 10,669,068 B2 | 6/2020 | Burns et al. | |
| 10,676,260 B2 | 6/2020 | Merrigan et al. | |
| 10,696,530 B2 | 6/2020 | Springer | |
| 10,737,866 B2 | 8/2020 | Wu | |
| 10,750,842 B2 | 8/2020 | Sengupta | |
| 10,822,249 B2 | 11/2020 | McDonald et al. | |
| 10,836,549 B2 | 11/2020 | Maguire | |
| 10,842,313 B2 | 11/2020 | Novak et al. | |
| 10,858,156 B1 | 12/2020 | Singh | |
| 10,898,017 B2 | 1/2021 | Kalisz et al. | |
| 10,898,868 B2 | 1/2021 | Yueh | |
| 10,906,013 B2 | 2/2021 | Cohen et al. | |
| 10,933,388 B1 | 3/2021 | Falcone | |
| 10,973,938 B1 | 4/2021 | Graham | |
| 10,974,210 B2 | 4/2021 | Hay | |
| 10,981,704 B2 | 4/2021 | Crawley | |
| 10,988,389 B1 | 4/2021 | Guduru | |
| 10,993,561 B2 | 5/2021 | Wiesman et al. | |
| 11,001,418 B2 | 5/2021 | Li | |
| 11,008,139 B2 | 5/2021 | Ziccardi et al. | |
| 11,045,774 B2 | 6/2021 | Bergamaschi et al. | |
| 11,046,606 B2 | 6/2021 | Lovegrove | |
| 11,051,641 B2 | 7/2021 | Schucker et al. | |
| 11,072,475 B2 | 7/2021 | Weiksnar | |
| 11,142,380 B1 | 10/2021 | Bowles | |
| 11,148,927 B2 | 10/2021 | Wing et al. | |
| 11,161,654 B2 | 11/2021 | Eisner | |
| 11,161,660 B2 | 11/2021 | Darsey et al. | |
| 11,172,784 B2 | 11/2021 | Pinelli et al. | |
| 11,180,296 B2 | 11/2021 | Bangera et al. | |
| 11,180,358 B1 | 11/2021 | Reyes Perez Valenzuela | |
| 11,193,680 B1 | 12/2021 | Caballero et al. | |
| 11,203,515 B2 | 12/2021 | Cook | |
| 11,214,499 B2 | 1/2022 | Guduru | |
| 11,242,177 B2 | 2/2022 | Gallay et al. | |
| 11,254,586 B1 | 2/2022 | Santoiemmo | |
| 11,267,724 B2 | 3/2022 | Wiegele | |
| 11,274,027 B2 | 3/2022 | Kruger et al. | |
| 11,319,204 B2 | 5/2022 | Zohar et al. | |
| 11,325,761 B2 | 5/2022 | West | |
| 11,332,290 B2 | 5/2022 | Maguire | |
| 11,338,971 B1 | 5/2022 | Capper et al. | |
| 11,375,844 B2 | 7/2022 | Singer | |
| 11,390,513 B2 | 7/2022 | Walton et al. | |
| 11,395,558 B2 | 7/2022 | Smith et al. | |
| 11,399,661 B2 | 8/2022 | Lapsker | |
| 11,427,389 B2 | 8/2022 | Chin | |
| 11,427,457 B1 | 8/2022 | Michelsen et al. | |
| 11,433,362 B2 | 9/2022 | Danieli et al. | |
| 11,458,443 B2 | 10/2022 | Noall et al. | |
| 2008/0110929 A1 | 5/2008 | Stanley Traasdahl et al. | |
| 2015/0225221 A1 | 8/2015 | Wilder et al. | |
| 2016/0040796 A1* | 2/2016 | Omesti | F16K 37/0058 |
| | | | 137/511 |
| 2019/0275478 A1 | 9/2019 | Jersey et al. | |
| 2020/0017283 A1 | 1/2020 | Ramsey et al. | |
| 2020/0148526 A1* | 5/2020 | Rittenburg | B67D 1/125 |
| 2020/0198846 A1 | 6/2020 | Yueh | |
| 2020/0375221 A1 | 12/2020 | Colvin et al. | |
| 2021/0047068 A1 | 2/2021 | De Cleir et al. | |
| 2021/0047166 A1 | 2/2021 | McKay | |
| 2021/0106127 A1 | 4/2021 | Chen | |
| 2021/0147125 A1 | 5/2021 | McNamara et al. | |
| 2021/0380332 A1 | 12/2021 | Rege et al. | |
| 2022/0002042 A1 | 1/2022 | Luhrs et al. | |
| 2022/0016581 A1 | 1/2022 | Waggoner et al. | |
| 2022/0033244 A1 | 2/2022 | Doelman et al. | |
| 2022/0089986 A1 | 3/2022 | Travers et al. | |
| 2022/0144506 A1 | 5/2022 | Albaum et al. | |
| 2022/0167766 A1 | 6/2022 | Lanphear et al. | |

(56) References Cited

U.S. PATENT DOCUMENTS

| | | |
|---|---|---|
| 2022/0218144 A1 | 7/2022 | Roberts et al. |
| 2022/0266207 A1 | 8/2022 | Gilman |
| 2022/0287333 A1 | 9/2022 | Aldred et al. |
| 2022/0287490 A1 | 9/2022 | Singleton |
| 2023/0167915 A1* | 6/2023 | Muzzo .................... F16K 17/16 137/68.19 |

FOREIGN PATENT DOCUMENTS

| | | | | |
|---|---|---|---|---|
| GB | 2036905 A | * | 7/1980 | |
| GB | 2136104 A | * | 9/1984 | ............ F16K 1/306 |
| GB | 2216958 A | * | 10/1989 | ............ A62C 13/64 |
| WO | WO-8801981 A1 | * | 3/1988 | |
| WO | WO-20142054771 A1 | * | 12/2014 | |

* cited by examiner

CONTAINER FOR LIQUID AND METHOD ASSOCIATED THEREWITH

CROSS-REFERENCE TO RELATED APPLICATION

This application claims priority to U.S. provisional patent application 63/323,441, filed Mar. 24, 2022, the disclosure of which is incorporated by reference herein in its entirety.

FIELD

The present invention relates to a container, and more particularly, to a container that stores a drinkable liquid.

BACKGROUND

Containers that store drinkable liquids are well known. The containers may be insulated or uninsulated. Examples of such containers include bottles, canteens, and thermoses.

SUMMARY

The Claims, rather than the Summary, define covered embodiments of the present invention. The Summary is a high-level overview of various aspects of the invention, and introduces some of the concepts that are further described in the Detailed Description below. The Summary is not intended to identify key or essential features of the claimed subject matter, and also is not intended to be used in isolation to determine the scope of the claimed subject matter. The subject matter should be understood by reference to appropriate portions of the entire Specification, any or all drawings, and each claim.

In some embodiments, the present invention provides a method, comprising: obtaining a cartridge having a first fluid within an interior of the cartridge, wherein the cartridge includes a valve; obtaining a container having a second fluid within an interior of the container; obtaining a pressurizer; installing the cartridge within the pressurizer; installing the pressurizer within a container opening at a top end of the container; and opening the valve in the cartridge, to flow the first fluid within the interior of the cartridge through a first flow path in the valve, and a second flow path in the pressurizer into the second fluid in the container.

In some embodiments, the valve is proximate to the top end of the container.

In some embodiments, the first fluid comprises a first pressurized gas.

In some embodiments, the second fluid comprises a liquid.

In some embodiments, the second fluid comprises a drinkable liquid.

In some embodiments, the opening of the valve in the cartridge comprises: opening the valve in the cartridge, to flow the first fluid within the interior of the cartridge through the first flow path in the valve, and the second flow path in the pressurizer into the second fluid in the container, thereby to pressurize the second fluid in the container.

In some embodiments, the first fluid comprises carbon dioxide.

In some embodiments, the method further comprises removing the pressurizer from the container opening at the top end of the container, thereby to provide access to a mixture of the first fluid and the second fluid.

In some embodiments, the installing the pressurizer further comprises engaging threads of the pressurizer with threads of the container.

In some embodiments, the valve comprises: a valve housing; and a valve stem, wherein the valve stem is movable within the valve housing; and the opening the valve in the cartridge further comprises: moving the valve stem in a first direction to permit flow between the valve stem and the valve housing.

In some embodiments, the valve stem further comprises: a third flow path; and a valve disk blocking the third flow path, wherein the valve disk is configured to rupture when exposed to a predetermined pressure.

In some embodiments, at least a portion of the first flow path extends in a first direction, at least a portion of the second flow path extends in a second direction, and the first direction is different than the second direction.

In some embodiments, the first direction is opposite the second direction.

In some embodiments, the present invention provides a method, comprising: obtaining a cartridge, wherein the cartridge comprises: a cartridge body; and a cartridge neck, wherein the cartridge body comprises a cartridge interior storing a first fluid, wherein the cartridge neck includes a valve; obtaining a container, wherein the container comprises a container interior storing a second fluid; obtaining a pressurizer, wherein the pressurizer comprises a pressurizer body; installing the cartridge within the pressurizer body; installing the pressurizer within a container opening at a top end of the container; and opening the valve in the cartridge, to flow the first fluid within the cartridge interior through a first flow path in the valve, and a second flow path in the pressurizer into the second fluid in the container.

In some embodiments, the cartridge neck comprises a first thread, the valve comprises a second thread, and the first thread and the second thread engage with one another.

In some embodiments, the valve further comprises a valve seat, wherein the valve seat is movable between a first position that closes the first flow path, and a second position that opens through the first flow path.

In some embodiments, the valve further comprises a spring, wherein the spring biases the valve toward the first position.

In some embodiments, the method further comprises removing the pressurizer from the container, thereby to provide access to a mixture of the first fluid and the second fluid.

In some embodiments, installing the cartridge within the pressurizer body further comprises installing a cap on an end of the pressurizer body.

In some embodiments, threads of the cap engage with threads of the pressurizer body.

In some embodiments, installing the pressurizer further comprises engaging threads of the pressurizer with threads of the container.

In some embodiments, the valve further comprises a sealing component, wherein the sealing component impedes flow between the valve and the cartridge.

In some embodiments, the valve is proximate to the top end of the container.

In some embodiments, the first fluid comprises a first pressurized gas.

In some embodiments, the opening the valve in the cartridge comprises opening the valve in the cartridge, to flow the first fluid within the cartridge interior through the first flow path in the valve, and the second flow path in the pressurizer into the second fluid in the container, thereby to pressurize the second fluid in the container.

In some embodiments, the first fluid comprises liquid and/or gaseous carbon dioxide.

In some embodiments, the method further comprises removing the pressurizer from the container opening at the top end of the container, thereby to provide access to a mixture of the first fluid and the second fluid in the container.

In some embodiments, installing the pressurizer further comprises engaging threads of the pressurizer with threads of the container.

In some embodiments, the valve comprises: a valve housing; and a valve stem, wherein the valve stem is movable within the valve housing; and the opening the valve in the cartridge further comprises moving the valve stem in a first direction to permit flow between the valve stem and the valve housing.

In some embodiments, the valve stem further comprises: a third flow path; and a valve disk blocking the third flow path, wherein the valve disk is configured to rupture when exposed to a predetermined pressure.

In some embodiments, at least a portion of the first flow path extends in a first direction, at least a portion of the second flow path extends in a second direction, and the first direction is different than the second direction.

In some embodiments, the first direction is opposite the second direction.

BRIEF DESCRIPTION OF THE DRAWINGS

This section refers to the drawings that form a part of this disclosure, and which illustrate embodiments of materials and methods described herein.

DETAILED DESCRIPTION

Figure 1:
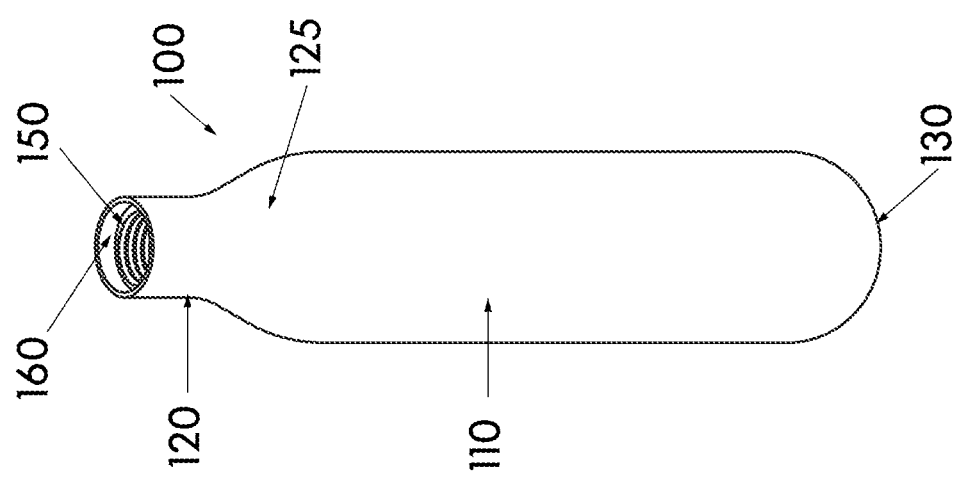
FIG. 1 is a perspective view of a cartridge, in accordance with some embodiments of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase or phrases, as used herein, do not necessarily refer to the same embodiment or embodiments, though the phrase or phrases may refer to the same embodiment or embodiments. Furthermore, the phrase "in another embodiment," and any similar phrase or phrases, as used herein, do not necessarily refer to a different embodiment, although the phrase or phrases may refer to a different embodiment. All embodiments of the disclosure are intended to be combinable without departing from the scope or spirit of the disclosure.

As used herein, terms such as "comprising," "including," "having," "with," and any similar phrase or phrases, do not limit the scope of a specific claim to the materials or steps recited by the claim.

In some embodiments, the present invention may provide a cartridge in which a fluid (that is, a liquid and/or a gas) is stored with an interior. In some embodiments, the liquid and/or the gas may be a pressurized liquid and/or gas. In some embodiments, a valve may be installed in the cartridge in which the liquid, the gas, the pressurized liquid, and/or the pressurized gas is stored. In some embodiments, the cartridge may be installed in a pressurizer. In some embodiments, the pressurizer may be installed in a container in which a fluid (for example, a liquid) is stored within or in an interior. In some embodiments, the pressurizer may be installed in the container in which a drinkable liquid (that is, a liquid that is suitable for human consumption) is stored within the interior.

In some embodiments, actuation of the valve may flow the liquid, the gas, the pressurized liquid, and/or the pressurized gas stored in the interior of the cartridge, from the interior of the cartridge, through the valve, through the pressurizer, and into the liquid that is stored in the interior of the container. In some embodiments, flowing the liquid, the gas, the pressurized liquid, and/or the pressurized gas stored in the interior of the cartridge, from the interior of the cartridge and into the liquid that is stored in the interior of the container, may mix the liquid and/or the gas from the cartridge with the liquid in the container. In some embodiments, the pressurized liquid and/or gas flowing from the cartridge may pressurize the liquid that is stored in the interior of the container. In some embodiments, the pressurized liquid and/or gas stored in and flowing from the interior of the cartridge may be liquid and/or gaseous carbon dioxide. In some embodiments, the liquid stored in the interior of the container may be a beverage. In some embodiments, the beverage may be one or more of, or something other than, water, fruit juice, vegetable juice, a soft drink, and/or alcohol. In some embodiments, flowing pressurized liquid and/or gaseous carbon dioxide stored in the interior of the cartridge, from the interior of the cartridge, through the valve, through the pressurizer, and into the liquid stored in the interior of the container, may carbonate the liquid stored in the interior of the container.

Figure 2:
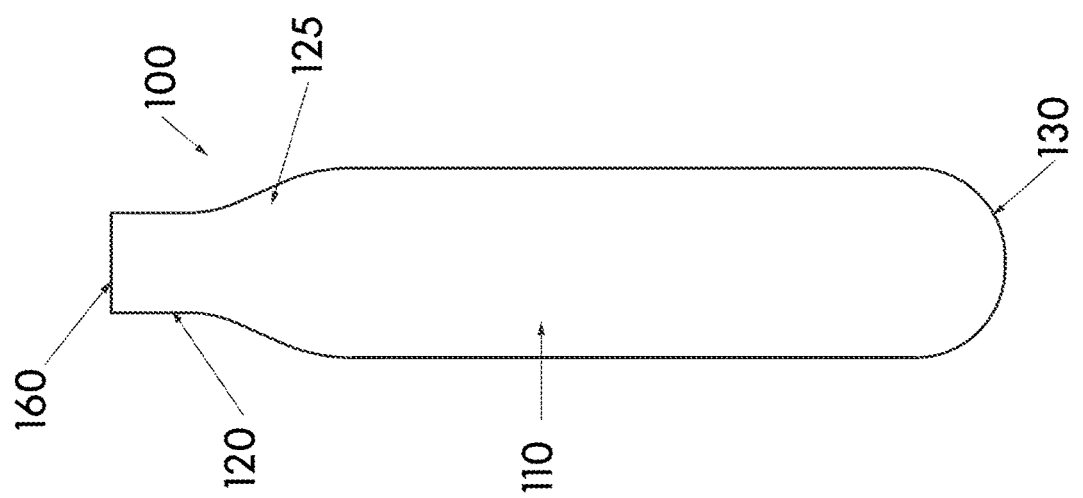
FIG. 2 is a front view of the cartridge, in accordance with some embodiments of the invention.

With reference to the drawings, FIG. 1 is a perspective view of a cartridge 100, in accordance with some embodiments of the invention. FIG. 2 is a front view of the cartridge 100, in accordance with some embodiments of the invention.

Figure 3:
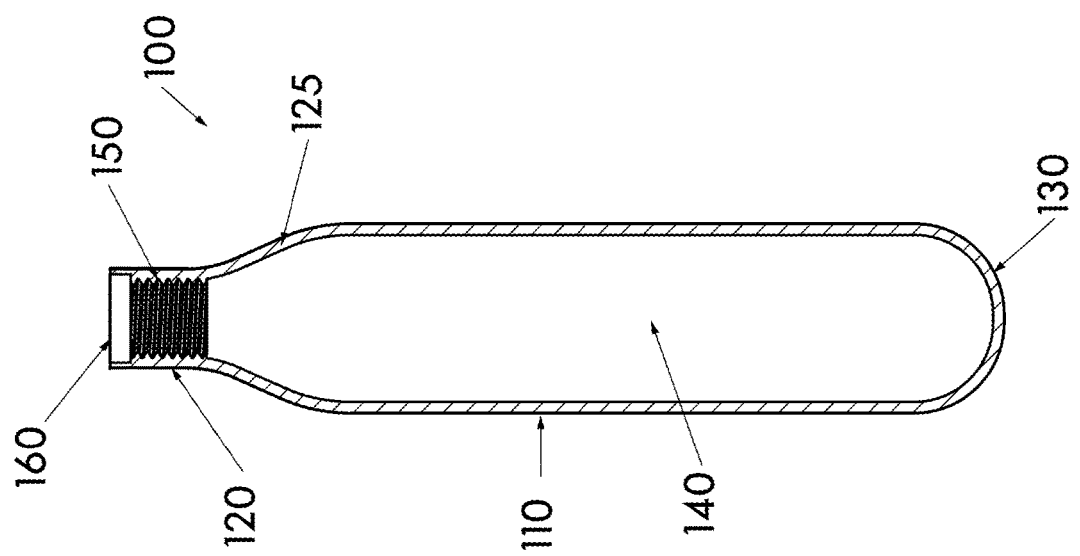
FIG. 3 is a cross-sectional view of the cartridge, in accordance with some embodiments of the invention.

FIG. 3 is a cross-sectional view of the cartridge 100, in accordance with some embodiments of the invention.

As shown in the figures, in some embodiments, the cartridge 100 may include a cartridge body 110. In some embodiments, the cartridge 100 may include a cartridge neck 120. In some embodiments, the cartridge body 110 and the cartridge neck 120 may be connected to one another. In some embodiments, a cartridge intermediate portion 125 may be between the cartridge body 110 and the cartridge neck 120. In some embodiments, the cartridge 100 may include a cartridge base 130. In some embodiments, the cartridge body 110 and the cartridge base 130 may be connected. In some embodiments, the cartridge body 110, the cartridge neck 120, and the cartridge base 130 may define a cartridge interior 140. As discussed, in some embodiments, the cartridge interior 140 may store the liquid, the gas, the pressurized liquid, and/or the pressurized gas therein.

In some embodiments, the cartridge neck 120 may include one or more cartridge threads 150, for attachment with the valve 200 described below. In some embodiments, the cartridge threads 150 may be formed on an interior of the cartridge neck 120. In some embodiments, the cartridge neck 120 may define a cartridge opening 160 into the cartridge interior 140. In some embodiments, the liquid, the gas, the pressurized liquid, and/or the pressurized gas may flow into and/or out of the cartridge interior 140 of the cartridge 100, through the cartridge opening 160 of the cartridge neck 120, as discussed.

As shown in the drawings, in some embodiments, components of the cartridge 100, such as but not limited to the cartridge body 110 and/or the cartridge neck 120, and/or other components, may have a generally cylindrical shape. In some embodiments, the cartridge body 110 may have a circular cross-section. In some embodiments, the cartridge body 110 may have a non-circular cross-section. In some embodiments, the cartridge body 110 may have an elliptical cross-section. In some embodiments, the cartridge body 110 may have an arcuate cross-section.

As shown in the drawings, in some embodiments, the cartridge neck 120 may have a circular cross-section. In some embodiments, the cartridge neck 120 may have a non-circular cross-section. In some embodiments, the cartridge neck 120 may have an elliptical cross-section. In some embodiments, the cartridge neck 120 may have an arcuate cross-section.

In some embodiments, the cartridge intermediate portion 125 may have a circular cross-section. In some embodiments, the cartridge intermediate portion 125 may have a non-circular cross-section. In some embodiments, the cartridge intermediate portion 125 may have an elliptical cross-section. In some embodiments, the cartridge intermediate portion 125 may have an arcuate cross-section. In some embodiments, the cartridge intermediate portion 125 may be a transitional portion of the cartridge 100, connecting the cartridge neck 120 and the cartridge body 110.

In some embodiments, a diameter of the cartridge body 110 may be greater than a diameter of the cartridge neck 120. In some embodiments, the diameter of the cartridge body 110 may be less than the diameter of the cartridge neck 120. In some embodiments, the diameter of the cartridge body 110 may be the same as the diameter of the cartridge neck 120. In some embodiments, one diameter of the cartridge intermediate portion 125 may be the same as the diameter of the cartridge body 110, and a second diameter of the cartridge intermediate portion 125 may be the same as the diameter of the cartridge neck 120. In some embodiments, a third diameter of the cartridge intermediate portion 125 may be less than the first diameter and greater than the second diameter. In some embodiments, the cartridge base 130 may have an arcuate shape. In some embodiments, the cartridge base 130 may have a non-arcuate shape.

In some embodiments, as discussed, the cartridge 100 may store a liquid within the cartridge interior 140. In some embodiments, the cartridge 100 may store a gas within the cartridge interior 140. In some embodiments, the cartridge 100 may store a pressurized liquid within the cartridge interior 140. In some embodiments, the cartridge 100 may store a pressurized gas within the cartridge interior 140. In some embodiments, the cartridge 100 may store one or more of, or all of, a liquid, a gas, a pressurized liquid, and/or a pressurized gas, within the cartridge interior 140.

In some embodiment, the cartridge interior 140 of the cartridge 100 may communicate with a volume outside of the cartridge 100 through the cartridge opening 160 of the cartridge neck 120. In some embodiments, the cartridge interior 140 of the cartridge 100 may be filled with the liquid, the gas, the pressurized liquid, and/or the pressurized gas through the cartridge opening 160—that is, the liquid, the gas, the pressurized liquid, and/or the pressurized gas may flow into the cartridge interior 140 through the cartridge opening 160 of the cartridge neck 120. In some embodiments, the liquid, the gas, the pressurized liquid, and/or the pressurized gas stored in the cartridge interior 140 of the cartridge 100 may flow out of the cartridge 100, through the cartridge opening 160 of the cartridge neck 120.

In some embodiments, the liquid and/or the gas stored within the cartridge interior 140 may be suitable for human consumption. In some embodiments, the liquid and/or the gas may be suitable for adding to another liquid and/or gas stored in container 400, as further described below. In some embodiments, the liquid and/or the gas stored in the cartridge interior 140 of the cartridge 100 may be suitable for pressurizing another liquid stored in the container 400, to which the liquid and/or the gas from the cartridge 100 is added. In some embodiments, the liquid and/or the gas stored in the cartridge interior 140 of the cartridge 100 may be one or more of liquid and/or gaseous air, carbon dioxide, nitrogen, helium, argon, and/or combinations or one or more of these and/or another gas and/or other gases. In some embodiments, the liquid and/or the gas stored in the cartridge interior 140 of the cartridge 100 may be unsuitable for human consumption.

In some embodiments, the cartridge 100 may be manufactured from a metal. In some embodiments, the cartridge 100 may be manufactured from iron. In some embodiments, the cartridge 100 may be manufactured from steel. In some embodiments, the cartridge 100 may be manufactured from stainless steel. In some embodiments, the cartridge 100 may be manufactured from aluminum. In some embodiments, the cartridge 100 may be manufactured from 6061-T6 aluminum. In some embodiments, the cartridge 100 may be anodized. In some embodiments, the cartridge 100 may be anodized 6061-T6 aluminum. In some embodiments, the cartridge 100 may be carbon fiber. In some embodiments, the cartridge 100 may be composites including combinations of the above materials, and/or other materials.

In some embodiments, the cartridge 100 may be manufactured by an extrusion process. In some embodiments, the cartridge 100 may be manufactured from a backwards extrusion process.

In some embodiments, a diameter of the cartridge opening 160 may be less than an outer diameter of the cartridge body 110. In some embodiments, a diameter of the cartridge opening 160 may be less than half of an outer diameter of the cartridge body 110. In some embodiments, a thickness of a wall of the cartridge base 130 of the cartridge 100 may equal to or greater than a thickness of a wall of the cartridge body 110. In some embodiments, the thickness of the wall of the cartridge base 130 may be equal to or greater than a thickness of a wall of the cartridge neck 120. In some embodiments, the thickness of the wall of the cartridge base 130 of the cartridge 100 may be equal to or greater than each of the thickness of the wall of the cartridge body 110 and the thickness of the wall of the cartridge neck 120. In some embodiments, the thickness of the wall of the cartridge base 130 of the cartridge 100 may be less than the thickness of the wall of the cartridge body 110. In some embodiments, the thickness of the wall of the cartridge base 130 may be less than the thickness of the wall of the cartridge neck 120. In some embodiments, the thickness of the wall of the cartridge base 130 of the cartridge 100 may be less than each of the thickness of the wall of the cartridge body 110 and the thickness of the wall of the cartridge neck 120.

In some embodiments, the cartridge threads 150 may be formed as a continuous thread on the interior of the cartridge neck 120 of the cartridge 100. In some embodiments, the cartridge threads 150 may be formed as a continuous thread including 2 threads between the top and bottom ends of the cartridge threads 150, on the interior of the cartridge neck 120 of the cartridge 100. In some embodiments, the cartridge threads 150 may be formed as a continuous thread including at least 2 threads between the top and bottom ends of the cartridge threads 150, on the interior of the cartridge neck 120 of the cartridge 100. In some embodiments, the cartridge threads 150 may be formed as a continuous thread including 3 threads between the top and bottom ends of the cartridge threads 150, on the interior of the cartridge neck 120 of the cartridge 100. In some embodiments, the cartridge threads 150 may be formed as a continuous thread including at least 3 threads between the top and bottom ends of the cartridge threads 150, on the interior of the cartridge neck 120 of the cartridge 100. In some embodiments, the cartridge threads 150 may be formed as a continuous thread including 4 threads between the top and bottom ends of the cartridge threads 150, on the interior of the cartridge neck 120 of the cartridge 100. In some embodiments, the cartridge threads 150 may be formed as a continuous thread including at least 4 threads between the top and bottom ends of the cartridge threads 150, on the interior of the cartridge neck 120 of the cartridge 100. In some embodiments, the cartridge threads 150 may be formed as a continuous thread including 5 threads between the top and bottom ends of the cartridge threads 150, on the interior of the cartridge neck 120 of the cartridge 100. In some embodiments, the cartridge threads 150 may be formed as a continuous thread including at least 5 threads between the top and bottom ends of the cartridge threads 150, on the interior of the cartridge neck 120 of the cartridge 100. In some embodiments, the cartridge threads 150 may be formed as a continuous thread including 6 threads between the top and bottom ends of the cartridge threads 150, on the interior of the cartridge neck 120 of the cartridge 100. In some embodiments, the cartridge threads 150 may be formed as a continuous thread including at least 6 threads between the top and bottom ends of the cartridge threads 150, on the interior of the cartridge neck 120 of the cartridge 100. In some embodiments, the cartridge threads 150 may be formed as a continuous thread including 7 threads between the top and bottom ends of the cartridge threads 150, on the interior of the cartridge neck 120 of the cartridge 100. In some embodiments, the cartridge threads 150 may be formed as a continuous thread including at least 7 threads between the top and bottom ends of the cartridge threads 150, on the interior of the cartridge neck 120 of the cartridge 100. In some embodiments, the cartridge threads 150 may be formed as a continuous thread including 8 threads between the top and bottom ends of the cartridge threads 150, on the interior of the cartridge neck 120 of the cartridge 100. In some embodiments, the cartridge threads 150 may be formed as a continuous thread including at least 8 threads between the top and bottom ends of the cartridge threads 150, on the interior of the cartridge neck 120 of the cartridge 100. In some embodiments, the cartridge threads 150 may be formed as a continuous thread including 9 threads between the top and bottom ends of the cartridge threads 150, on the interior of the cartridge neck 120 of the cartridge 100. In some embodiments, the cartridge threads 150 may be formed as a continuous thread including at least 9 threads between the top and bottom ends of the cartridge threads 150, on the interior of the cartridge neck 120 of the cartridge 100. In some embodiments, the cartridge threads 150 may be formed as a continuous thread including 10 threads between the top and bottom ends of the cartridge threads 150, on the interior of the cartridge neck 120 of the cartridge 100. In some embodiments, the cartridge threads 150 may be formed as a continuous thread including more than 10 threads between the top and bottom ends of the cartridge threads 150, on the interior of the cartridge neck 120 of the cartridge 100.

In some embodiments, a volume of the cartridge interior 140 may be less than 40 ml. In some embodiments, a volume of the cartridge interior 140 may be less than 39 ml. In some embodiments, a volume of the cartridge interior 140 may be less than 38 ml. In some embodiments, a volume of the cartridge interior 140 may be less than 37 ml. In some embodiments, a volume of the cartridge interior 140 may be less than 36 ml. In some embodiments, a volume of the cartridge interior 140 may be less than 35 ml. In some embodiments, a volume of the cartridge interior 140 may be less than 34 ml. In some embodiments, a volume of the cartridge interior 140 may be less than 33 ml. In some embodiments, a volume of the cartridge interior 140 may be less than 32 ml. In some embodiments, a volume of the cartridge interior 140 may be less than 31 ml. In some embodiments, a volume of the cartridge interior 140 may be less than 30 ml. In some embodiments, a volume of the cartridge interior 140 may be less than 29 ml. In some embodiments, a volume of the cartridge interior 140 may be less than 28 ml. In some embodiments, a volume of the cartridge interior 140 may be less than 27 ml. In some embodiments, a volume of the cartridge interior 140 may be less than 26 ml. In some embodiments, a volume of the cartridge interior 140 may be less than 25 ml. In some embodiments, a volume of the cartridge interior 140 may be less than 24 ml. In some embodiments, a volume of the cartridge interior 140 may be less than 23 ml. In some embodiments, a volume of the cartridge interior 140 may be less than 22 ml. In some embodiments, a volume of the cartridge interior 140 may be less than 21 ml. In some embodiments, a volume of the cartridge interior 140 may be less than 20 ml. In some embodiments, a volume of the cartridge interior 140 may be less than 19 ml. In some embodiments, a volume of the cartridge interior 140 may be less than 18 ml. In some embodiments, a volume of the cartridge interior 140 may be less than 17 ml. In some embodiments, a volume of the cartridge interior 140 may be less than 16 ml. In some embodiments, a volume of the cartridge interior 140 may be less than 15 ml. In some embodiments, a volume of the cartridge interior 140 may be less than 14 ml. In some embodiments, a volume of the cartridge interior 140 may be less than 13 ml. In some embodiments, a volume of the cartridge interior 140 may be less than 12 ml. In some embodiments, a volume of the cartridge interior 140 may be less than 11 ml. In some embodiments, a volume of the cartridge interior 140 may be less than 10 ml. In some embodiments, a volume of the cartridge interior 140 may be less than 9 ml. In some embodiments, a volume of the cartridge interior 140 may be less than 8 ml. In some embodiments, a volume of the cartridge interior 140 may be less than 7 ml. In some embodiments, a volume of the cartridge interior 140 may be less than 6 ml. In some embodiments, a volume of the cartridge interior 140 may be less than 5 ml. In some embodiments, a volume of the cartridge interior 140 may be 40 ml. In some embodiments, a volume of the cartridge interior 140 may be 39 ml. In some embodiments, a volume of the cartridge interior 140 may be 38 ml. In some embodiments, a volume of the cartridge interior 140 may be 37 ml. In some embodiments, a volume of the cartridge interior 140 may be 36 ml. In some embodiments, a volume of the cartridge interior 140 may be 35 ml. In some embodiments, a volume of the cartridge interior 140 may be 34 ml. In some embodiments, a volume of the cartridge interior 140 may be 33 ml. In some embodiments, a volume of the cartridge interior 140 may be 32 ml. In some embodiments, a volume of the cartridge interior 140 may be 31 ml. In some embodiments, a volume of the cartridge interior 140 may be 30 ml. In some embodiments, a volume of the cartridge interior 140 may be 29 ml. In some embodiments, a volume of the cartridge interior 140 may be 28 ml. In some embodiments, a volume of the cartridge interior 140 may be 27 ml. In some embodiments, a volume of the cartridge interior 140 may be 26 ml. In some embodiments, a volume of the cartridge interior 140 may be 25 ml. In some embodiments, a volume of the cartridge interior 140 may be 24 ml. In some embodiments, a volume of the cartridge interior 140 may be 23 ml. In some embodiments, a volume of the cartridge interior 140 may be 22 ml. In some embodiments, a volume of the cartridge interior 140 may be 21 ml. In some embodiments, a volume of the cartridge interior 140 may be 20 ml. In some embodiments, a volume of the cartridge interior 140 may be 19 ml. In some embodiments, a volume of the cartridge interior 140 may be 18 ml. In some embodiments, a volume of the cartridge interior 140 may be 17 ml. In some embodiments, a volume of the cartridge interior 140 may be 16 ml. In some embodiments, a volume of the cartridge interior 140 may be 15 ml. In some embodiments, a volume of the cartridge interior 140 may be 14 ml. In some embodiments, a volume of the cartridge interior 140 may be 13 ml. In some embodiments, a volume of the cartridge interior 140 may be 12 ml. In some embodiments, a volume of the cartridge interior 140 may be 11 ml. In some embodiments, a volume of the cartridge interior 140 may be 10 ml. In some embodiments, a volume of the cartridge interior 140 may be 9 ml. In some embodiments, a volume of the cartridge interior 140 may be 8 ml. In some embodiments, a volume of the cartridge interior 140 may be 7 ml. In some embodiments, a volume of the cartridge interior 140 may be 6 ml. In some embodiments, a volume of the cartridge interior 140 may be 5 ml.

In some embodiments, the cartridge 100 may meet or exceed the standard for a DOT ("Department of Transportation") 3AL seamless aluminum cylinder. In some embodiments, the cartridge 100 may exceed the standard for a DOT 3AL seamless aluminum cylinder. In some embodiments, the cartridge 100 may meet the standard for a DOT 3AL seamless aluminum cylinder. In some embodiments, the cartridge 100 may not meet the standard for a DOT 3AL seamless aluminum cylinder.

In some embodiments, the cartridge 100 may have an overall length of 89.66 mm. In some embodiments, the cartridge 100 may have an overall length greater than 89.66 mm. In some embodiments, the cartridge 100 may have an overall length of less than 89.66 mm.

In some embodiments, the cartridge body 110 of the cartridge 100 may have an outer diameter of greater than 25 mm. In some embodiments, the cartridge body 110 of the cartridge 100 may have an outer diameter of 25 mm. In some embodiments, the cartridge body 110 of the cartridge 100 may have an outer diameter of 24 mm. In some embodiments, the cartridge body 110 of the cartridge 100 may have an outer diameter of 23 mm. In some embodiments, the cartridge body 110 of the cartridge 100 may have an outer diameter of 22 mm. In some embodiments, the cartridge body 110 of the cartridge 100 may have an outer diameter of 21 mm. In some embodiments, the cartridge body 110 of the cartridge 100 may have an outer diameter of 20 mm. In some embodiments, the cartridge body 110 of the cartridge 100 may have an outer diameter of 19 mm. In some embodiments, the cartridge body 110 of the cartridge 100 may have an outer diameter of 18 mm. In some embodiments, the cartridge body 110 of the cartridge 100 may have an outer diameter of 17 mm. In some embodiments, the cartridge body 110 of the cartridge 100 may have an outer diameter of 16 mm. In some embodiments, the cartridge body 110 of the cartridge 100 may have an outer diameter of 15 mm. In some embodiments, the cartridge body 110 of the cartridge 100 may have an outer diameter of 14 mm. In some embodiments, the cartridge body 110 of the cartridge 100 may have an outer diameter of 13 mm. In some embodiments, the cartridge body 110 of the cartridge 100 may have an outer diameter of 12 mm. In some embodiments, the cartridge body 110 of the cartridge 100 may have an outer diameter of 10 mm. In some embodiments, the cartridge body 110 of the cartridge 100 may have an outer diameter of less than 10 mm.

In some embodiments, the cartridge neck 120 of the cartridge 100 may have an inner diameter of greater than 15 mm. In some embodiments, the cartridge neck 120 of the cartridge 100 may have an inner diameter of 15 mm. In some embodiments, the cartridge neck 120 of the cartridge 100 may have an inner diameter of 14 mm. In some embodiments, the cartridge neck 120 of the cartridge 100 may have an inner diameter of 13 mm. In some embodiments, the cartridge neck 120 of the cartridge 100 may have an inner diameter of 12 mm. In some embodiments, the cartridge neck 120 of the cartridge 100 may have an inner diameter of 11 mm. In some embodiments, the cartridge neck 120 of the cartridge 100 may have an inner diameter of 10 mm. In some embodiments, the cartridge neck 120 of the cartridge 100 may have an inner diameter of 9 mm. In some embodiments, the cartridge neck 120 of the cartridge 100 may have an inner diameter of 8 mm. In some embodiments, the cartridge neck 120 of the cartridge 100 may have an inner diameter of 7 mm. In some embodiments, the cartridge neck 120 of the cartridge 100 may have an inner diameter of 6 mm. In some embodiments, the cartridge neck 120 of the cartridge 100 may have an inner diameter of 5 mm. In some embodiments, the cartridge neck 120 of the cartridge 100 may have an inner diameter of less than 5 mm.

In some embodiments, the cartridge 100 may have a wall thickness of greater than 2.0 mm. In some embodiments, the cartridge 100 may have a wall thickness of 2 mm. In some embodiments, the cartridge 100 may have a wall thickness of 1.9 mm. In some embodiments, the cartridge 100 may have a wall thickness of 1.8 mm. In some embodiments, the cartridge 100 may have a wall thickness of 1.7 mm. In some embodiments, the cartridge 100 may have a wall thickness of 1.6 mm. In some embodiments, the cartridge 100 may have a wall thickness of 1.5 mm. In some embodiments, the cartridge 100 may have a wall thickness of 1.4 mm. In some embodiments, the cartridge 100 may have a wall thickness of 1.3 mm. In some embodiments, the cartridge 100 may have a wall thickness of 1.2 mm. In some embodiments, the cartridge 100 may have a wall thickness of 1.1 mm. In some embodiments, the cartridge 100 may have a wall thickness of 1 mm. In some embodiments, the cartridge 100 may have a wall thickness of 0.9 mm. In some embodiments, the cartridge 100 may have a wall thickness of 0.8 mm. In some embodiments, the cartridge 100 may have a wall thickness of 0.7 mm. In some embodiments, the cartridge 100 may have a wall thickness of 0.6 mm. In some embodiments, the cartridge 100 may have a wall thickness of 0.5 mm. In some embodiments, the cartridge 100 may have a wall thickness of less than 0.5 mm.

In some embodiments, the cartridge 100 may have a yield pressure of at least 4,900 PSI. In some embodiments, the cartridge 100 may have a yield pressure of greater than 4,900 PSI. In some embodiments, the cartridge 100 may have a yield pressure of less than 4,900 PSI. In some embodiments, the cartridge 100 may have a burst pressure of at least 6,000 PSI. In some embodiments, the cartridge 100 may have a burst pressure of greater than 6,000 PSI. In some embodiments, the cartridge 100 may have a burst pressure of 6,000 PSI. In some embodiments, the cartridge 100 may have a burst pressure of less than 6,000 PSI.

In some embodiments, a volume of the cartridge interior 140 may be greater than 17 ml. In some embodiments, a volume of the cartridge interior 140 may be 17 ml. In some embodiments, a volume of the cartridge interior 140 may be 16.9 ml. In some embodiments, a volume of the cartridge interior 140 may be 16.8 ml. In some embodiments, a volume of the cartridge interior 140 may be 16.7 ml. In some embodiments, a volume of the cartridge interior 140 may be 16.6 ml. In some embodiments, a volume of the cartridge interior 140 may be 16.5 ml. In some embodiments, a volume of the cartridge interior 140 may be 16.4 ml. In some embodiments, a volume of the cartridge interior 140 may be 16.3 ml. In some embodiments, a volume of the cartridge interior 140 may be 16.2 ml. In some embodiments, a volume of the cartridge interior 140 may be 16.1 ml. In some embodiments, a volume of the cartridge interior 140 may be 16 ml. In some embodiments, a volume of the cartridge interior 140 may be 15.9 ml. In some embodiments, a volume of the cartridge interior 140 may be 15.8 ml. In some embodiments, a volume of the cartridge interior 140 may be 15.7 ml. In some embodiments, a volume of the cartridge interior 140 may be 15.6 ml. In some embodiments, a volume of the cartridge interior 140 may be 15.5 ml. In some embodiments, a volume of the cartridge interior 140 may be 15.4 ml. In some embodiments, a volume of the cartridge interior 140 may be 15.3 ml. In some embodiments, a volume of the cartridge interior 140 may be 15.2 ml. In some embodiments, a volume of the cartridge interior 140 may be 15.1 ml. In some embodiments, a volume of the cartridge interior 140 may be 15 ml. In some embodiments, a volume of the cartridge interior 140 may be 14.9 ml. In some embodiments, a volume of the cartridge interior 140 may be 14.8 ml. In some embodiments, a volume of the cartridge interior 140 may be 14.7 ml. In some embodiments, a volume of the cartridge interior 140 may be 14.6 ml. In some embodiments, a volume of the cartridge interior 140 may be 14.5 ml. In some embodiments, a volume of the cartridge interior 140 may be 14.4 ml. In some embodiments, a volume of the cartridge interior 140 may be 14.3 ml. In some embodiments, a volume of the cartridge interior 140 may be 14.2 ml. In some embodiments, a volume of the cartridge interior 140 may be 14.1 ml. In some embodiments, a volume of the cartridge interior 140 may be 14 ml. In some embodiments, a volume of the cartridge interior 140 may be less than 14 ml.

In some embodiments, the cartridge 100 may be designed to hold more than 20 g of carbon dioxide at a pressure of 850 PSI, when the cartridge 100 is at a temperature of 70 degrees Fahrenheit, within the cartridge interior 140. In some embodiments, the cartridge 100 may be designed to hold 20 g of carbon dioxide at a pressure of 850 PSI, when the cartridge 100 is at a temperature of 70 degrees Fahrenheit, within the cartridge interior 140. In some embodiments, the cartridge 100 may be designed to hold 19 g of carbon dioxide at a pressure of 850 PSI, when the cartridge 100 is at a temperature of 70 degrees Fahrenheit, within the cartridge interior 140. In some embodiments, the cartridge 100 may be designed to hold 18 g of carbon dioxide at a pressure of 850 PSI, when the cartridge 100 is at a temperature of 70 degrees Fahrenheit, within the cartridge interior 140. In some embodiments, the cartridge 100 may be designed to hold 17 g of carbon dioxide at a pressure of 850 PSI, when the cartridge 100 is at a temperature of 70 degrees Fahrenheit, within the cartridge interior 140. In some embodiments, the cartridge 100 may be designed to hold 16 g of carbon dioxide at a pressure of 850 PSI, when the cartridge 100 is at a temperature of 70 degrees Fahrenheit, within the cartridge interior 140. In some embodiments, the cartridge 100 may be designed to hold 15 g of carbon dioxide at a pressure of 850 PSI, when the cartridge 100 is at a temperature of 70 degrees Fahrenheit, within the cartridge interior 140. In some embodiments, the cartridge 100 may be designed to hold 14 g of carbon dioxide at a pressure of 850 PSI, when the cartridge 100 is at a temperature of 70 degrees Fahrenheit, within the cartridge interior 140. In some embodiments, the cartridge 100 may be designed to hold 13 g of carbon dioxide at a pressure of 850 PSI, when the cartridge 100 is at a temperature of 70 degrees Fahrenheit, within the cartridge interior 140. In some embodiments, the cartridge 100 may be designed to hold 12 g of carbon dioxide at a pressure of 850 PSI, when the cartridge 100 is at a temperature of 70 degrees Fahrenheit, within the cartridge interior 140. In some embodiments, the cartridge 100 may be designed to hold 11 g of carbon dioxide at a pressure of 850 PSI, when the cartridge 100 is at a temperature of 70 degrees Fahrenheit, within the cartridge interior 140. In some embodiments, the cartridge 100 may be designed to hold 10 g of carbon dioxide at a pressure of 850 PSI, when the cartridge 100 is at a temperature of 70 degrees Fahrenheit, within the cartridge interior 140. In some embodiments, the cartridge 100 may be designed to hold 9 g of carbon dioxide at a pressure of 850 PSI, when the cartridge 100 is at a temperature of 70 degrees Fahrenheit, within the cartridge interior 140. In some embodiments, the cartridge 100 may be designed to hold 8 g of carbon dioxide at a pressure of 850 PSI, when the cartridge 100 is at a temperature of 70 degrees Fahrenheit, within the cartridge interior 140. In some embodiments, the cartridge 100 may be designed to hold 7 g of carbon dioxide at a pressure of 850 PSI, when the cartridge 100 is at a temperature of 70 degrees Fahrenheit, within the cartridge interior 140. In some embodiments, the cartridge 100 may be designed to hold 6 g of carbon dioxide at a pressure of 850 PSI, when the cartridge 100 is at a temperature of 70 degrees Fahrenheit, within the cartridge interior 140. In some embodiments, the cartridge 100 may be designed to hold 5 g of carbon dioxide at a pressure of 850 PSI, when the cartridge 100 is at a temperature of 70 degrees Fahrenheit, within the cartridge interior 140. In some embodiments, the cartridge 100 may be designed to hold less than 5 g of carbon dioxide at a pressure of 850 PSI, when the cartridge 100 is at a temperature of 70 degrees Fahrenheit, within the cartridge interior 140.

In some embodiments, at least 1% of the gas or liquid in the cartridge 100 may be delivered to the liquid in the container 400. In some embodiments, at least 2% of the gas or liquid in the cartridge 100 may be delivered to the liquid in the container 400. In some embodiments, at least 3% of the gas or liquid in the cartridge 100 may be delivered to the liquid in the container 400. In some embodiments, at least 4% of the gas or liquid in the cartridge 100 may be delivered to the liquid in the container 400. In some embodiments, at least 5% of the gas or liquid in the cartridge 100 may be delivered to the liquid in the container 400. In some embodiments, at least 10% of the gas or liquid in the cartridge 100 may be delivered to the liquid in the container 400. In some embodiments, at least 15% of the gas or liquid in the cartridge 100 may be delivered to the liquid in the container 400. In some embodiments, at least 20% of the gas or liquid in the cartridge 100 may be delivered to the liquid in the container 400. In some embodiments, at least 25% of the gas or liquid in the cartridge 100 may be delivered to the liquid in the container 400. In some embodiments, at least 30% of the gas or liquid in the cartridge 100 may be delivered to the liquid in the container 400. In some embodiments, at least 35% of the gas or liquid in the cartridge 100 may be delivered to the liquid in the container 400. In some embodiments, at least 40% of the gas or liquid in the cartridge 100 may be delivered to the liquid in the container 400. In some embodiments, at least 45% of the gas or liquid in the cartridge 100 may be delivered to the liquid in the container 400. In some embodiments, at least 50% of the gas or liquid in the cartridge 100 may be delivered to the liquid in the container 400. In some embodiments, at least 55% of the gas or liquid in the cartridge 100 may be delivered to the liquid in the container 400. In some embodiments, at least 60% of the gas or liquid in the cartridge 100 may be delivered to the liquid in the container 400. In some embodiments, at least 65% of the gas or liquid in the cartridge 100 may be delivered to the liquid in the container 400. In some embodiments, at least 70% of the gas or liquid in the cartridge 100 may be delivered to the liquid in the container 400. In some embodiments, at least 75% of the gas or liquid in the cartridge 100 may be delivered to the liquid in the container 400. In some embodiments, at least 80% of the gas or liquid in the cartridge 100 may be delivered to the liquid in the container 400. In some embodiments, at least 85% of the gas or liquid in the cartridge 100 may be delivered to the liquid in the container 400. In some embodiments, at least 90% of the gas or liquid in the cartridge 100 may be delivered to the liquid in the container 400. In some embodiments, at least 91% of the gas or liquid in the cartridge 100 may be delivered to the liquid in the container 400. In some embodiments, at least 92% of the gas or liquid in the cartridge 100 may be delivered to the liquid in the container 400. In some embodiments, at least 93% of the gas or liquid in the cartridge 100 may be delivered to the liquid in the container 400. In some embodiments, at least 94% of the gas or liquid in the cartridge 100 may be delivered to the liquid in the container 400. In some embodiments, at least 95% of the gas or liquid in the cartridge 100 may be delivered to the liquid in the container 400. In some embodiments, at least 96% of the gas or liquid in the cartridge 100 may be delivered to the liquid in the container 400. In some embodiments, at least 97% of the gas or liquid in the cartridge 100 may be delivered to the liquid in the container 400. In some embodiments, at least 98% of the gas or liquid in the cartridge 100 may be delivered to the liquid in the container 400. In some embodiments, at least 99% of the gas or liquid in the cartridge 100 may be delivered to the liquid in the container 400. In some embodiments, 100% of the gas or liquid in the cartridge 100 may be delivered to the liquid in the container 400.

In some embodiments, more than 1% of the gas or liquid in the cartridge 100 may be delivered to the liquid in the container 400. In some embodiments, more than 2% of the gas or liquid in the cartridge 100 may be delivered to the liquid in the container 400. In some embodiments, more than 3% of the gas or liquid in the cartridge 100 may be delivered to the liquid in the container 400. In some embodiments, more than 4% of the gas or liquid in the cartridge 100 may be delivered to the liquid in the container 400. In some embodiments, more than 5% of the gas or liquid in the cartridge 100 may be delivered to the liquid in the container 400. In some embodiments, more than 10% of the gas or liquid in the cartridge 100 may be delivered to the liquid in the container 400. In some embodiments, more than 15% of the gas or liquid in the cartridge 100 may be delivered to the liquid in the container 400. In some embodiments, more than 20% of the gas or liquid in the cartridge 100 may be delivered to the liquid in the container 400. In some embodiments, more than 25% of the gas or liquid in the cartridge 100 may be delivered to the liquid in the container 400. In some embodiments, more than 30% of the gas or liquid in the cartridge 100 may be delivered to the liquid in the container 400. In some embodiments, more than 35% of the gas or liquid in the cartridge 100 may be delivered to the liquid in the container 400. In some embodiments, more than 40% of the gas or liquid in the cartridge 100 may be delivered to the liquid in the container 400. In some embodiments, more than 45% of the gas or liquid in the cartridge 100 may be delivered to the liquid in the container 400. In some embodiments, more than 50% of the gas or liquid in the cartridge 100 may be delivered to the liquid in the container 400. In some embodiments, more than 55% of the gas or liquid in the cartridge 100 may be delivered to the liquid in the container 400. In some embodiments, more than 60% of the gas or liquid in the cartridge 100 may be delivered to the liquid in the container 400. In some embodiments, more than 65% of the gas or liquid in the cartridge 100 may be delivered to the liquid in the container 400. In some embodiments, more than 70% of the gas or liquid in the cartridge 100 may be delivered to the liquid in the container 400. In some embodiments, more than 75% of the gas or liquid in the cartridge 100 may be delivered to the liquid in the container 400. In some embodiments, more than 80% of the gas or liquid in the cartridge 100 may be delivered to the liquid in the container 400. In some embodiments, more than 85% of the gas or liquid in the cartridge 100 may be delivered to the liquid in the container 400. In some embodiments, more than 90% of the gas or liquid in the cartridge 100 may be delivered to the liquid in the container 400. In some embodiments, more than 91% of the gas or liquid in the cartridge 100 may be delivered to the liquid in the container 400. In some embodiments, more than 92% of the gas or liquid in the cartridge 100 may be delivered to the liquid in the container 400. In some embodiments, more than 93% of the gas or liquid in the cartridge 100 may be delivered to the liquid in the container 400. In some embodiments, more than 94% of the gas or liquid in the cartridge 100 may be delivered to the liquid in the container 400. In some embodiments, more than 95% of the gas or liquid in the cartridge 100 may be delivered to the liquid in the container 400. In some embodiments, more than 96% of the gas or liquid in the cartridge 100 may be delivered to the liquid in the container 400. In some embodiments, more than 97% of the gas or liquid in the cartridge 100 may be delivered to the liquid in the container 400. In some embodiments, more than 98% of the gas or liquid in the cartridge 100 may be delivered to the liquid in the container 400. In some embodiments, more than 99% of the gas or liquid in the cartridge 100 may be delivered to the liquid in the container 400.

In some embodiments, the cartridge 100 may be designed to hold a liquid and/or gas at a pressure of less than 100 PSI. In some embodiments, the cartridge 100 may be designed to hold a liquid and/or gas at a pressure of less than 150 PSI. In some embodiments, the cartridge 100 may be designed to hold a liquid and/or gas at a pressure of less than 200 PSI. In some embodiments, the cartridge 100 may be designed to hold a liquid and/or gas at a pressure of less than 250 PSI. In some embodiments, the cartridge 100 may be designed to hold a liquid and/or gas at a pressure of less than 300 PSI. In some embodiments, the cartridge 100 may be designed to hold a liquid and/or gas at a pressure of less than 350 PSI. In some embodiments, the cartridge 100 may be designed to hold a liquid and/or gas at a pressure of less than 400 PSI. In some embodiments, the cartridge 100 may be designed to hold a liquid and/or gas at a pressure of less than 450 PSI. In some embodiments, the cartridge 100 may be designed to hold a liquid and/or gas at a pressure of less than 500 PSI. In some embodiments, the cartridge 100 may be designed to hold a liquid and/or gas at a pressure of less than 550 PSI. In some embodiments, the cartridge 100 may be designed to hold a liquid and/or gas at a pressure of less than 600 PSI. In some embodiments, the cartridge 100 may be designed to hold a liquid and/or gas at a pressure of less than 650 PSI. In some embodiments, the cartridge 100 may be designed to hold a liquid and/or gas at a pressure of less than 700 PSI. In some embodiments, the cartridge 100 may be designed to hold a liquid and/or gas at a pressure of less than 750 PSI. In some embodiments, the cartridge 100 may be designed to hold a liquid and/or gas at a pressure of less than 800 PSI. In some embodiments, the cartridge 100 may be designed to hold a liquid and/or gas at a pressure of less than 850 PSI. In some embodiments, the cartridge 100 may be designed to hold a liquid and/or gas at a pressure of less than 900 PSI. In some embodiments, the cartridge 100 may be designed to hold a liquid and/or gas at a pressure of less than 950 PSI. In some embodiments, the cartridge 100 may be designed to hold a liquid and/or gas at a pressure of less than 1000 PSI. In some embodiments, the cartridge 100 may be designed to hold a liquid and/or gas at a pressure of less than 1100 PSI. In some embodiments, the cartridge 100 may be designed to hold a liquid and/or gas at a pressure of less than 1200 PSI. In some embodiments, the cartridge 100 may be designed to hold a liquid and/or gas at a pressure of less than 1300 PSI. In some embodiments, the cartridge 100 may be designed to hold a liquid and/or gas at a pressure of less than 1400 PSI. In some embodiments, the cartridge 100 may be designed to hold a liquid and/or gas at a pressure of less than 1500 PSI.

In some embodiments, the cartridge 100 may be designed to hold a liquid and/or gas at a pressure of greater than 100 PSI. In some embodiments, the cartridge 100 may be designed to hold a liquid and/or gas at a pressure of greater than 150 PSI. In some embodiments, the cartridge 100 may be designed to hold a liquid and/or gas at a pressure of greater than 200 PSI. In some embodiments, the cartridge 100 may be designed to hold a liquid and/or gas at a pressure of greater than 250 PSI. In some embodiments, the cartridge 100 may be designed to hold a liquid and/or gas at a pressure of greater than 300 PSI. In some embodiments, the cartridge 100 may be designed to hold a liquid and/or gas at a pressure of greater than 350 PSI. In some embodiments, the cartridge 100 may be designed to hold a liquid and/or gas at a pressure of greater than 400 PSI. In some embodiments, the cartridge 100 may be designed to hold a liquid and/or gas at a pressure of greater than 450 PSI. In some embodiments, the cartridge 100 may be designed to hold a liquid and/or gas at a pressure of greater than 500 PSI. In some embodiments, the cartridge 100 may be designed to hold a liquid and/or gas at a pressure of greater than 550 PSI. In some embodiments, the cartridge 100 may be designed to hold a liquid and/or gas at a pressure of greater than 600 PSI. In some embodiments, the cartridge 100 may be designed to hold a liquid and/or gas at a pressure of greater than 650 PSI. In some embodiments, the cartridge 100 may be designed to hold a liquid and/or gas at a pressure of greater than 700 PSI. In some embodiments, the cartridge 100 may be designed to hold a liquid and/or gas at a pressure of greater than 750 PSI. In some embodiments, the cartridge 100 may be designed to hold a liquid and/or gas at a pressure of greater than 800 PSI. In some embodiments, the cartridge 100 may be designed to hold a liquid and/or gas at a pressure of greater than 850 PSI. In some embodiments, the cartridge 100 may be designed to hold a liquid and/or gas at a pressure of greater than 900 PSI. In some embodiments, the cartridge 100 may be designed to hold a liquid and/or gas at a pressure of greater than 950 PSI. In some embodiments, the cartridge 100 may be designed to hold a liquid and/or gas at a pressure of greater than 1000 PSI. In some embodiments, the cartridge 100 may be designed to hold a liquid and/or gas at a pressure of greater than 1100 PSI. In some embodiments, the cartridge 100 may be designed to hold a liquid and/or gas at a pressure of greater than 1200 PSI. In some embodiments, the cartridge 100 may be designed to hold a liquid and/or gas at a pressure of greater than 1300 PSI. In some embodiments, the cartridge 100 may be designed to hold a liquid and/or gas at a pressure of greater than 1400 PSI. In some embodiments, the cartridge 100 may be designed to hold a liquid and/or gas at a pressure of greater than 1500 PSI.

In some embodiments, the cartridge 100 may have an overall weight of more than 17 g. In some embodiments, the cartridge 100 may have an overall weight of 17 g. In some embodiments, the cartridge 100 may have an overall weight of 16.9 g. In some embodiments, the cartridge 100 may have an overall weight of 16.8 g. In some embodiments, the cartridge 100 may have an overall weight of 16.7 g. In some embodiments, the cartridge 100 may have an overall weight of 16.6 g. In some embodiments, the cartridge 100 may have an overall weight of 16.5 g. In some embodiments, the cartridge 100 may have an overall weight of 16.4 g. In some embodiments, the cartridge 100 may have an overall weight of 16.3 g. In some embodiments, the cartridge 100 may have an overall weight of 16.2 g. In some embodiments, the cartridge 100 may have an overall weight of 16.1 g. In some embodiments, the cartridge 100 may have an overall weight of 16 g. In some embodiments, the cartridge 100 may have an overall weight of 15.9 g. In some embodiments, the cartridge 100 may have an overall weight of 15.8 g. In some embodiments, the cartridge 100 may have an overall weight of 15.7 g. In some embodiments, the cartridge 100 may have an overall weight of 15.6 g. In some embodiments, the cartridge 100 may have an overall weight of 15.5 g. In some embodiments, the cartridge 100 may have an overall weight of 15.4 g. In some embodiments, the cartridge 100 may have an overall weight of 15.3 g. In some embodiments, the cartridge 100 may have an overall weight of 15.2 g. In some embodiments, the cartridge 100 may have an overall weight of 15.1 g. In some embodiments, the cartridge 100 may have an overall weight of 15 g. In some embodiments, the cartridge 100 may have an overall weight of 14.9 g. In some embodiments, the cartridge 100 may have an overall weight of 14.8 g. In some embodiments, the cartridge 100 may have an overall weight of 14.7 g. In some embodiments, the cartridge 100 may have an overall weight of 14.6 g. In some embodiments, the cartridge 100 may have an overall weight of 14.5 g. In some embodiments, the cartridge 100 may have an overall weight of 14.4 g. In some embodiments, the cartridge 100 may have an overall weight of 14.3 g. In some embodiments, the cartridge 100 may have an overall weight of 14.2 g. In some embodiments, the cartridge 100 may have an overall weight of 14.1 g. In some embodiments, the cartridge 100 may have an overall weight of 14 g. In some embodiments, the cartridge 100 may have an overall weight of less than 14 g.

In some embodiments, the cartridge threads 150 may be M8x1 threads. In some embodiments, the cartridge threads 150 may not be M8x1 threads.

In some embodiments, the cartridge 100, whether or not filled with a liquid and/or a gas, and/or whether pressurized or not, may meet the standards so as to be designated as food grade. In some embodiments, the cartridge 100, whether or not filled with a liquid and/or a gas, and/or whether pressurized or not, may meet the standards so as to be designated as beverage grade. In some embodiments, the cartridge 100, whether or not filled with a liquid and/or a gas, and/or whether pressurized or not, may not meet the standards so as to be designated as food grade. In some embodiments, the cartridge 100, whether or not filled with a liquid and/or a gas, and/or whether pressurized or not, may not meet the standards so as to be designated as beverage grade.

Figure 4:
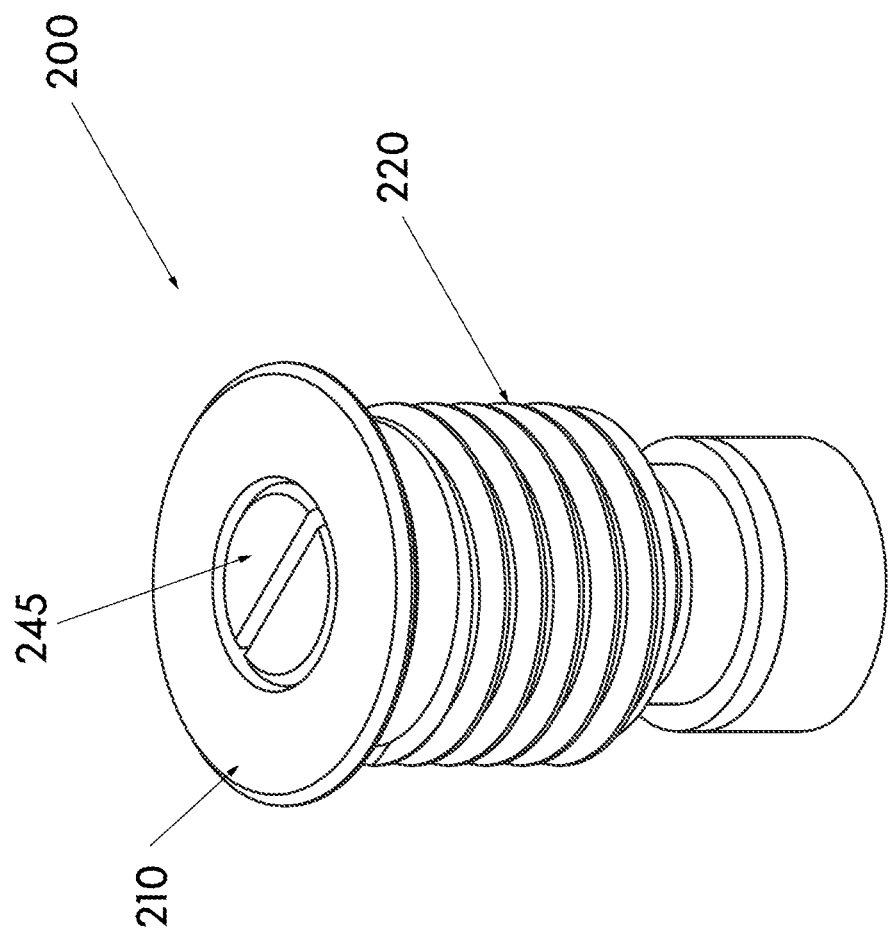
FIG. 4 is a perspective view of a valve, in accordance with some embodiments of the invention.
Figure 5:
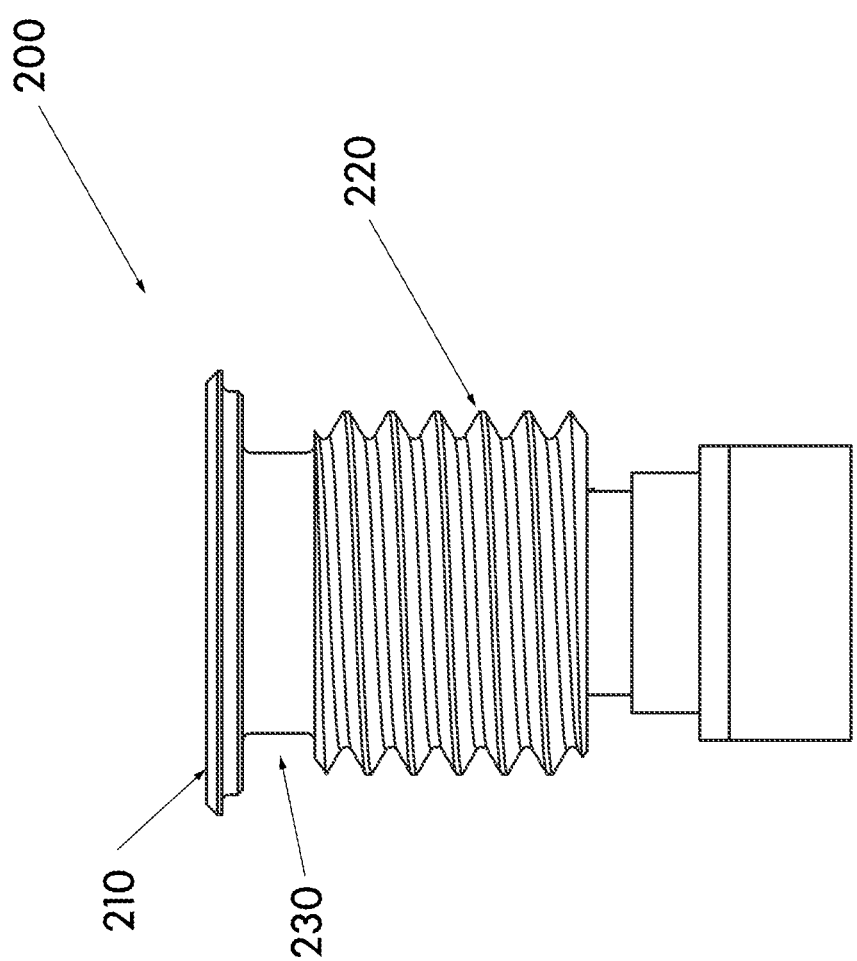
FIG. 5 is a front view of the valve, in accordance with some embodiments of the invention.
Figure 6:
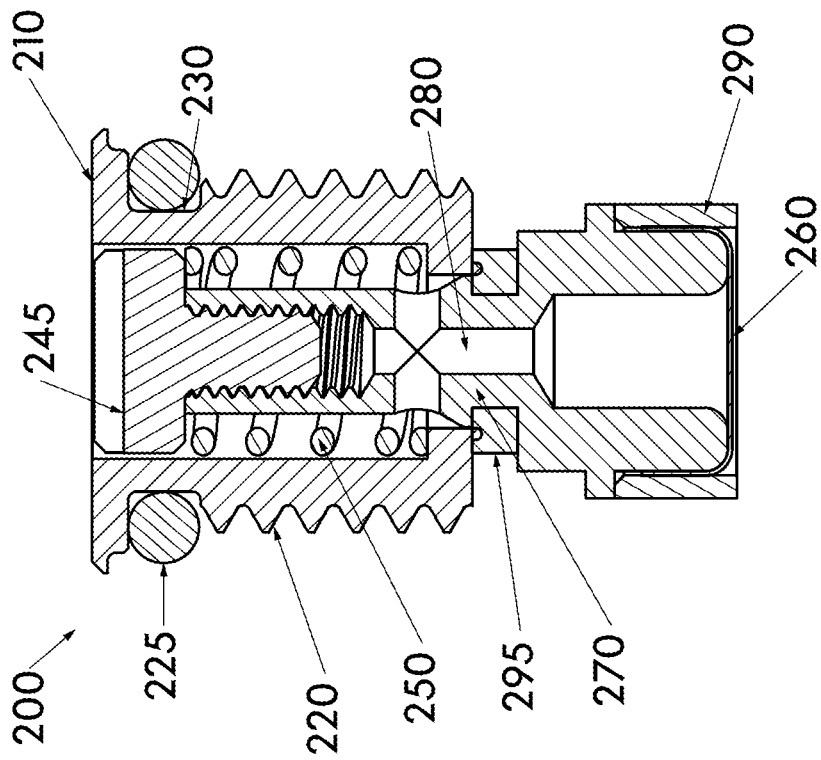
FIG. 6 is a cross-sectional view of the valve, in accordance with some embodiments of the invention.
Figure 7:
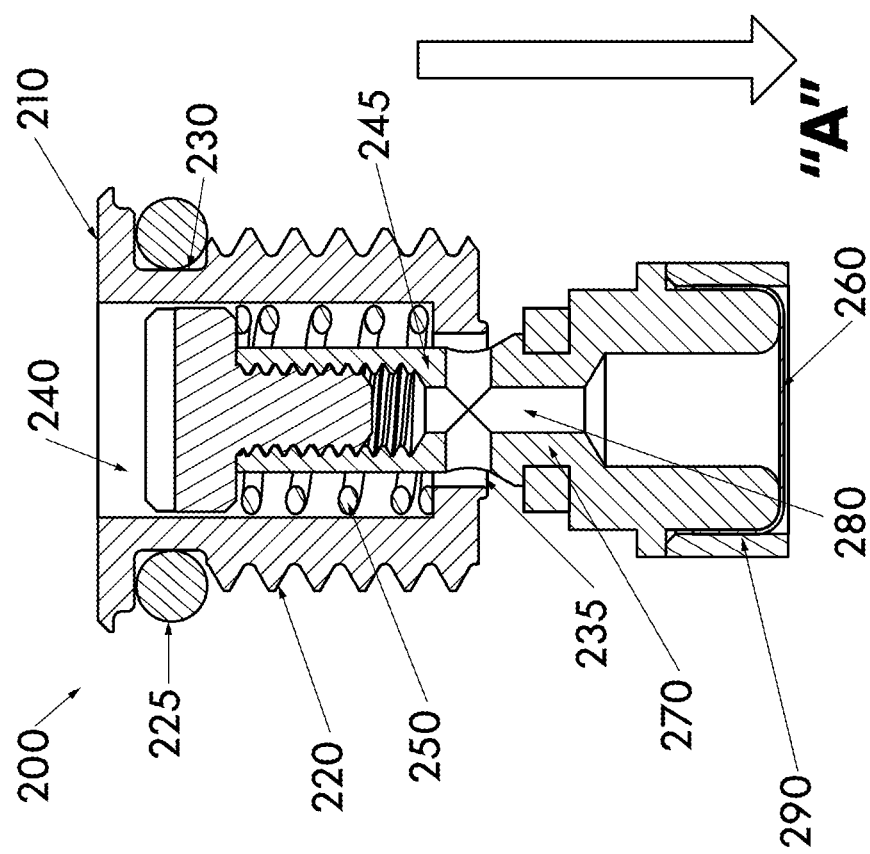
FIG. 7 is another cross-sectional view of the valve, in accordance with some embodiments of the invention.
Figure 8:
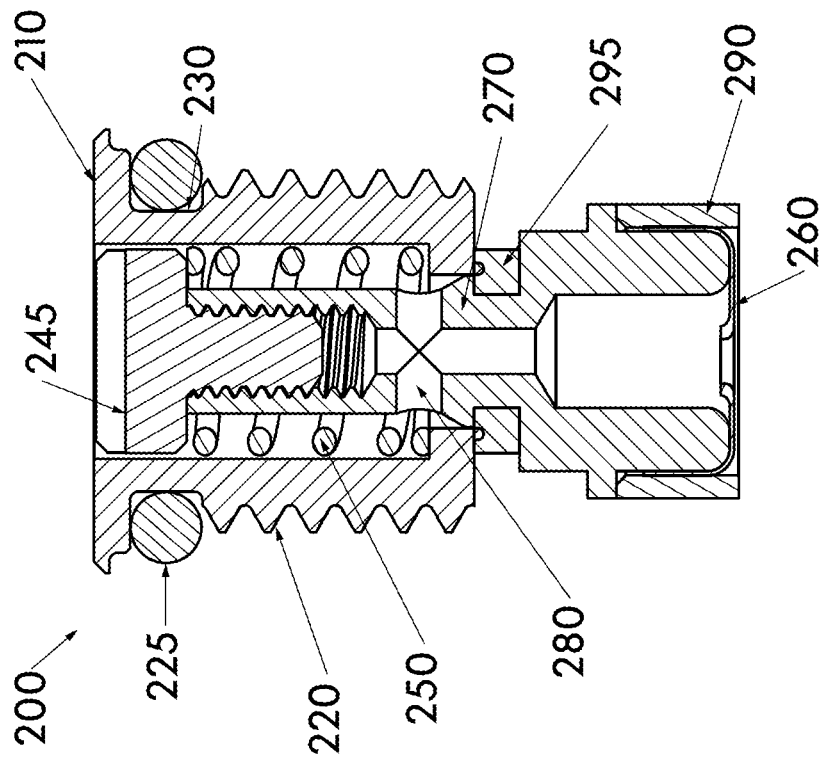
FIG. 8 is another cross-sectional view of the valve, in accordance with some embodiments of the invention.
Figure 9:
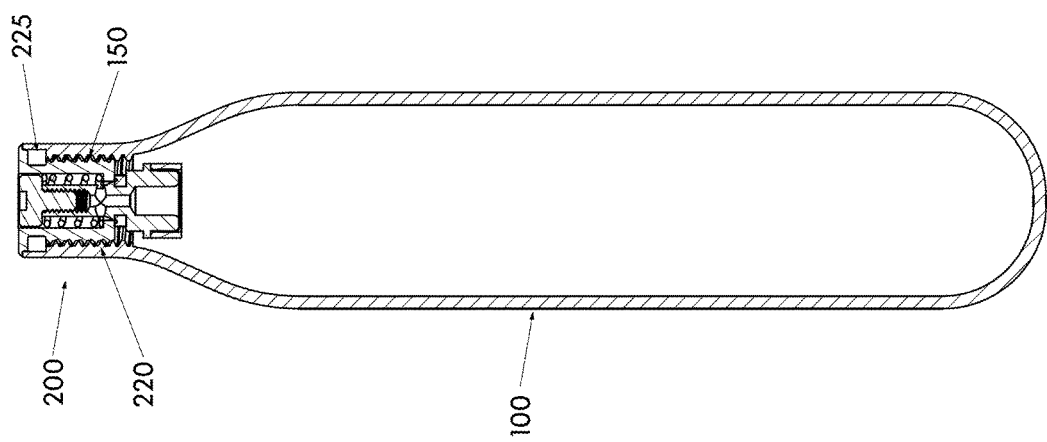
FIG. 9 is a cross-sectional view of the valve within the cartridge, in accordance with some embodiments of the invention.

FIG. 4 is a perspective view of a valve 200, in accordance with some embodiments of the invention. FIG. 5 is a front view of the valve 200, in accordance with some embodiments of the invention. FIG. 6 is a cross-sectional view of the valve 200, in accordance with some embodiments of the invention. FIG. 7 is another cross-sectional view of the valve 200, in accordance with some embodiments of the invention. FIG. 8 is another cross-sectional view of the valve 200, in accordance with some embodiments of the invention. FIG. 9 is a cross-sectional view of the valve 200 within the cartridge 100, in accordance with some embodiments of the invention.

As shown in the figures, in some embodiments, the valve 200 may be installed within the cartridge 100. In some embodiments, the valve 200 may be installed within the cartridge neck 120 of the cartridge 100. Although not shown in the figures, in some embodiments, the valve 200 may be installed within a portion of the cartridge 100 other than the cartridge neck 120.

In some embodiments, actuation of the valve 200 may permit the liquid and/or the gas to flow into the cartridge interior 140 of the cartridge 100, so that the cartridge 100 may be filled with and may store the liquid and/or the gas with the cartridge interior 140. In some embodiments, actuation of the valve 200 may permit the liquid and/or the gas to flow into the cartridge interior 140 of the cartridge 100 until the liquid and/or the gas is pressurized within the cartridge interior 140 of the cartridge 100. In some embodiments, actuation of the valve 200 may permit the liquid and/or the gas stored within the cartridge interior 140 of the cartridge 100 to flow out of the cartridge interior 140 and the cartridge 100, to a volume outside of the cartridge 100.

As shown in the figures, in some embodiments of the invention, the valve 200 may include a valve housing 210. In some embodiments, the valve housing 210 may include one or more valve threads 220. In some embodiments, the valve threads 220 may be sized, shaped, located, and/or dimensioned to threadingly engage the cartridge threads 150 of the cartridge neck 120, so that the valve 200 may be disposed within the cartridge neck 120 of the cartridge 100. In some embodiments, the valve threads 220 and/or the cartridge threads 150 may be sized, shaped, located, and/or dimensioned to impede flow of the liquid and/or the gas that is stored within the cartridge interior 140, between the valve 200 and the cartridge 100. In some embodiments, the valve threads 220 and/or the cartridge threads 150 may be sized, shaped, located, and/or dimensioned to impede flow of the liquid and/or the gas that is stored within the cartridge interior 140, between the cartridge neck 120 of the cartridge 100 and the valve housing 210 of the valve 200.

In some embodiments, the valve 200 may include a first sealing component 225. In some embodiments, when the valve threads 220 of the valve 200 threadingly engage the cartridge threads 150 of the cartridge 100, the first sealing component 225 may impede flow of the liquid and/or the gas from the cartridge 100, between the valve 200 and the cartridge 100. In some embodiments, the first sealing component 225 may be a gasket. In some embodiments, the first sealing component 225 may be an O-ring. In some embodiments, the first sealing component 225 may have a circular cross-section. In some embodiments, the first sealing component 225 may have a non-circular cross-section. In some embodiments, the first sealing component 225 may have an arcuate cross-section. In some embodiments, the first sealing component 225 may have an elliptical cross-section. In some embodiments, the first sealing component 225 may be formed from an elastic material. In some embodiments, the first sealing component 225 may be formed from an inelastic material. In some embodiments, the first sealing component 225 may elastically deform when the valve 200 is installed in the cartridge 100. In some embodiments, the first sealing component 225 may plastically deform when the valve 200 is installed in the cartridge 100.

In some embodiments, the first sealing component 225 may be installed in a valve groove 230 in the valve housing 210. In some embodiments, at least a portion of the valve groove 230 may have a circular cross-section. In some embodiments, at least a portion of the valve groove 230 may have a non-circular cross-section. In some embodiments, at least a portion of the valve groove 230 may have an arcuate cross-section. In some embodiments, at least a portion of the valve groove 230 may have an elliptical cross-section. In some embodiments, at least a portion of a cross-section of the valve groove 230 may be the same as at least a portion of a cross-section of the first sealing component 225. In some embodiments, at least a portion of a cross-section of the valve groove 230 may be different from at least a portion of a cross-section of the first sealing component 225.

In some embodiments, the valve 200 may be positionable between a first position to permit flow between the cartridge interior 140 of the cartridge 100 and a volume outside of the cartridge 100, and a second position to impede flow between the cartridge interior 140 of the cartridge 100 and the outside of the cartridge 100.

In some embodiments, the valve 200 may include a first flow path 235 through a valve interior 240 of the valve 200. As discussed, in some embodiments, the valve 200 may be positionable to permit flow both into and out of the cartridge interior 140 of the cartridge 100 through the first flow path 235 of the valve interior 240. Thus, in some embodiments, a liquid and/or a gas may flow from outside of the cartridge 100, through the first flow path 235 of the valve interior 240, and into the cartridge interior 140 of the cartridge 100. In some embodiments, the liquid and/or the gas stored within the cartridge interior 140 of the cartridge 100 may flow from the cartridge interior 140, through the first flow path 235 of the valve interior 240, and outside of the cartridge 100. In some embodiments, one or more components of the valve 200 may be positionable to flow the liquid and/or the gas from outside of the cartridge 100, through the first flow path 235 of the valve interior 240, and into the cartridge interior 140 of the cartridge 100. In some embodiments, one or more components of the valve 200 may be positionable to flow the liquid and/or the gas stored within the cartridge interior 140 of the cartridge 100, from the cartridge interior 140, through the first flow path 235 of the valve interior 240 of the valve 200, and to the outside of the cartridge 100.

In some embodiments, the valve 200 may include a valve stem 245. In some embodiments, the valve stem 245 may be positionable to flow the liquid and/or the gas into and/or out of the cartridge interior 140 of the cartridge 100, through the first flow path 235 of the valve interior 240. In some embodiments, the valve 200 may include a spring 250. In some embodiments, the valve stem 245 and the spring 250 may be disposed within the valve interior 240 of the valve housing 210. In some embodiments, the spring 250 may bias the valve stem 245 to a closed position—that is, so as to impede flow through the first flow path 235 of the valve interior 240. In some embodiments, as shown in the figures, the valve stem 245 may be formed as two pieces. By this arrangement, the spring 250 may be installed within the valve interior 240, encircling a first piece of the valve stem 245. A second piece of the valve stem 245 may be installed within the valve interior 240, such that the spring 250 is retained between the second piece of the valve stem 245 and a surface of the valve interior 240. In some embodiments, as shown in the figures, the first and second pieces of the valve stem 245 may include interior and exterior threads, which threadingly engage with one another, thereby connecting the pieces of the valve stem 245 to one another.

For example, as shown in FIG. 7, in some embodiments of the invention, when valve stem 245 is urged in a direction "A" by an actuator as described, direction "A" being opposite to the bias provided by spring 250, the valve stem 245 may be in an "open" position, to permit flow between the valve stem 245 and the valve housing 210, by opening the first flow path 235 of the valve interior 240. As shown in FIG. 8, in some embodiments of the invention, when the valve stem 245 is not urged in the direction "A," the spring 250 may act to urge the valve stem 245 (that is, the spring 250 may bias the valve stem 245) to a "closed" position, to impede flow between the valve stem 245 and the valve housing 210, by closing the first flow path 235 of the valve interior 240.

In some embodiments, the valve stem 245 may be moved in the direction "A" when filling the cartridge interior 140 of the cartridge 100 with the liquid, the gas, the pressurized liquid, and/or the pressurized gas—that is, when the liquid and/or the gas is flowed into the cartridge interior 140 of the cartridge 100. In some embodiments, the valve stem 245 may be moved in the direction "A" when releasing the liquid and/or the gas stored in the cartridge interior 140 of the cartridge 100—that is, when the valve 200 is actuated, to flow the liquid and/or gas stored within the cartridge interior 140 of the cartridge 100, to a space or volume outside of the cartridge interior 140.

In some embodiments, the valve 200 may include a valve disk 260. In some embodiments, the valve disk 260 may impede flow through the valve 200 under certain conditions. In some embodiments, the valve disk 260 may permit flow through the valve 200 under certain conditions. In some embodiments, the valve disk 260 may provide flow through at least a portion of a stem interior 270 of the valve stem 245 under certain conditions. In some embodiments, the valve disk 260 may provide flow through a second flow path 280 of the stem interior 270 under certain conditions.

In some embodiments, the valve disk 260 may be configured to rupture (e.g., break) at a predetermined pressure that is less than a pressure at which any other portion of the cartridge 100 and/or the valve 200 may yield and/or rupture, thereby preventing yielding and/or rupturing of the cartridge 100 and/or the valve 200, when the cartridge 100 including the valve 200 having the valve disk 260 is in the cartridge neck 120 of the cartridge 100. Thus, for example, in some embodiments, when the cartridge 100 has a yield pressure of at least 4,900 PSI, and/or a burst pressure of at least 6,000 PSI, the valve disk 260 may be sized, shaped, positioned, dimensioned, and/or made from an appropriate material, such that the valve disk 260 may rupture at a pressure of less than each of the yield and burst pressure. In some embodiments, when the cartridge 100 is over-pressurized, the valve disk 260 may rupture so that the cartridge 100 and/or the valve 200 does not yield and/or burst. FIG. 8 shows a cross-sectional view of the valve disk 260 after being exposed to a predetermine pressure that ruptures the valve disk 260.

In some embodiments, the valve disk 260 may rupture at more than 6,000 PSI. In some embodiments, the valve disk 260 may rupture at 6,000 PSI. In some embodiments, the valve disk 260 may rupture at 5,900 PSI. In some embodiments, the valve disk 260 may rupture at 5,800 PSI. In some embodiments, the valve disk 260 may rupture at 5,700 PSI. In some embodiments, the valve disk 260 may rupture at 5,600 PSI. In some embodiments, the valve disk 260 may rupture at 5,500 PSI. In some embodiments, the valve disk 260 may rupture at 5,400 PSI. In some embodiments, the valve disk 260 may rupture at 5,300 PSI. In some embodiments, the valve disk 260 may rupture at 5,200 PSI. In some embodiments, the valve disk 260 may rupture at 5,100 PSI. In some embodiments, the valve disk 260 may rupture at 5,000 PSI. In some embodiments, the valve disk 260 may rupture at 4,900 PSI. In some embodiments, the valve disk 260 may rupture at 4,800 PSI. In some embodiments, the valve disk 260 may rupture at 4,700 PSI. In some embodiments, the valve disk 260 may rupture at 4,600 PSI. In some embodiments, the valve disk 260 may rupture at 4,500 PSI. In some embodiments, the valve disk 260 may rupture at 4,400 PSI. In some embodiments, the valve disk 260 may rupture at 4,300 PSI. In some embodiments, the valve disk 260 may rupture at 4,200 PSI. In some embodiments, the valve disk 260 may rupture at 4,100 PSI. In some embodiments, the valve disk 260 may rupture at 4,000 PSI. In some embodiments, the valve disk 260 may rupture at 3,900 PSI. In some embodiments, the valve disk 260 may rupture at 3,800 PSI. In some embodiments, the valve disk 260 may rupture at 3,700 PSI. In some embodiments, the valve disk 260 may rupture at 3,600 PSI. In some embodiments, the valve disk 260 may rupture at 3,500 PSI. In some embodiments, the valve disk 260 may rupture at 3,400 PSI. In some embodiments, the valve disk 260 may rupture at 3,300 PSI. In some embodiments, the valve disk 260 may rupture at 3,200 PSI. In some embodiments, the valve disk 260 may rupture at 3,100 PSI. In some embodiments, the valve disk 260 may rupture at 3,000 PSI. In some embodiments, the valve disk 260 may rupture at less than 3,000 PSI.

In some embodiments, when the valve disk 260 is not ruptured, the valve disk 260 may impede flow through the second flow path 280 of the stem interior 270 into and/or out of the cartridge interior 140 of the cartridge 100, such as by blocking the second flow path 280. In some embodiments, when the valve disk 260 is ruptured, the valve disk 260 may permit flow through the second flow path 280 of the stem interior 270 into and/or out of the cartridge interior 140 of the cartridge 100.

In some embodiments, the valve disk 260 may be attached to a face of the valve stem 245. Although not shown, in some embodiments, the valve disk 260 may be attached to something other than a face of the valve stem 245. In some embodiments, the valve disk 260 may be attached to the face of the valve stem 245 by an annular component 290. In some embodiments, the annular component 290 may be removably attached to the valve stem 245. In some embodiments, the annular component 290 may be irremovably attached to the valve stem 245. In some embodiments, the valve disk 260 may be attached to the face of the valve stem 245 by something other than the annular component 290.

In some embodiments, the valve 200 may include a valve seat 295. In some embodiments, the valve seat 295 may come into and out of contact with the valve housing 210, to thereby permit and impede flow between the valve housing 210 and the valve stem 245, through the first flow path 235 of the valve interior 240 (that is, "open" and "close" the first flow path 235). In some embodiments, the valve seat 295 may be a separate component from the valve stem 245. In some embodiments, the valve seat 295 may be a portion of the valve stem 245. In some embodiments, the valve seat 295 may be omitted, and a portion of the valve stem 245 may be movable into and out of contact with the valve housing 210, to thereby permit and impede flow between the valve housing 210 and the valve stem 245, through the first flow path 235 of the valve interior 240.

Figure 10:
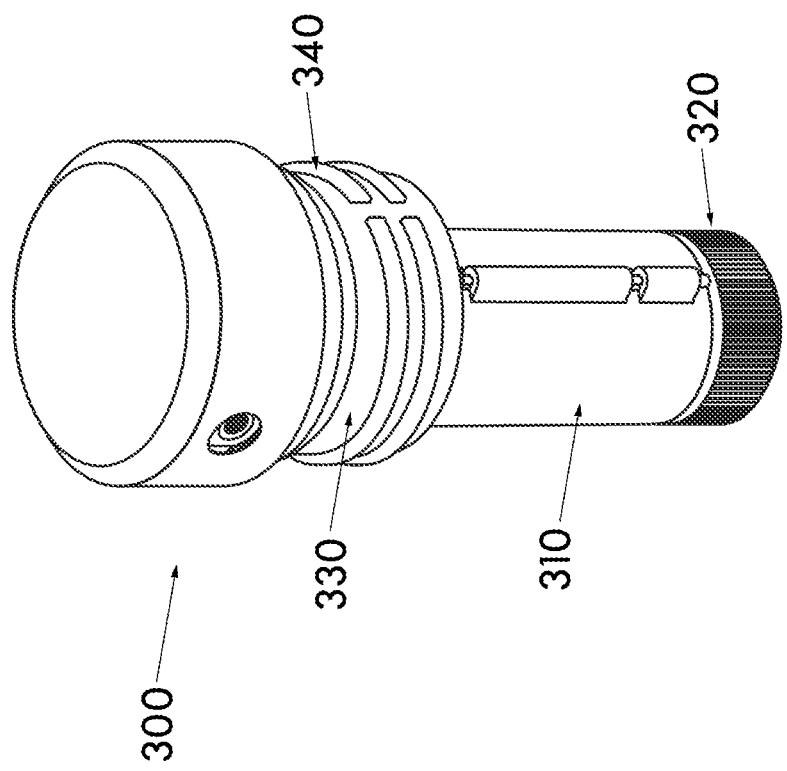
FIG. 10 is a perspective view of a pressurizer, in accordance with some embodiments of the invention.
Figure 11:
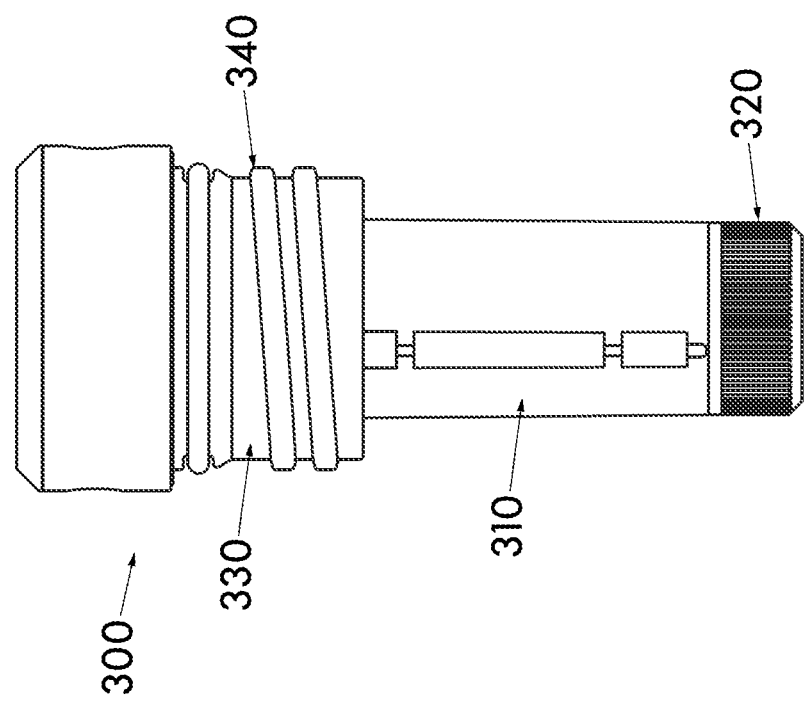
FIG. 11 is a front view of the pressurizer, in accordance with some embodiments of the invention.
Figure 12:
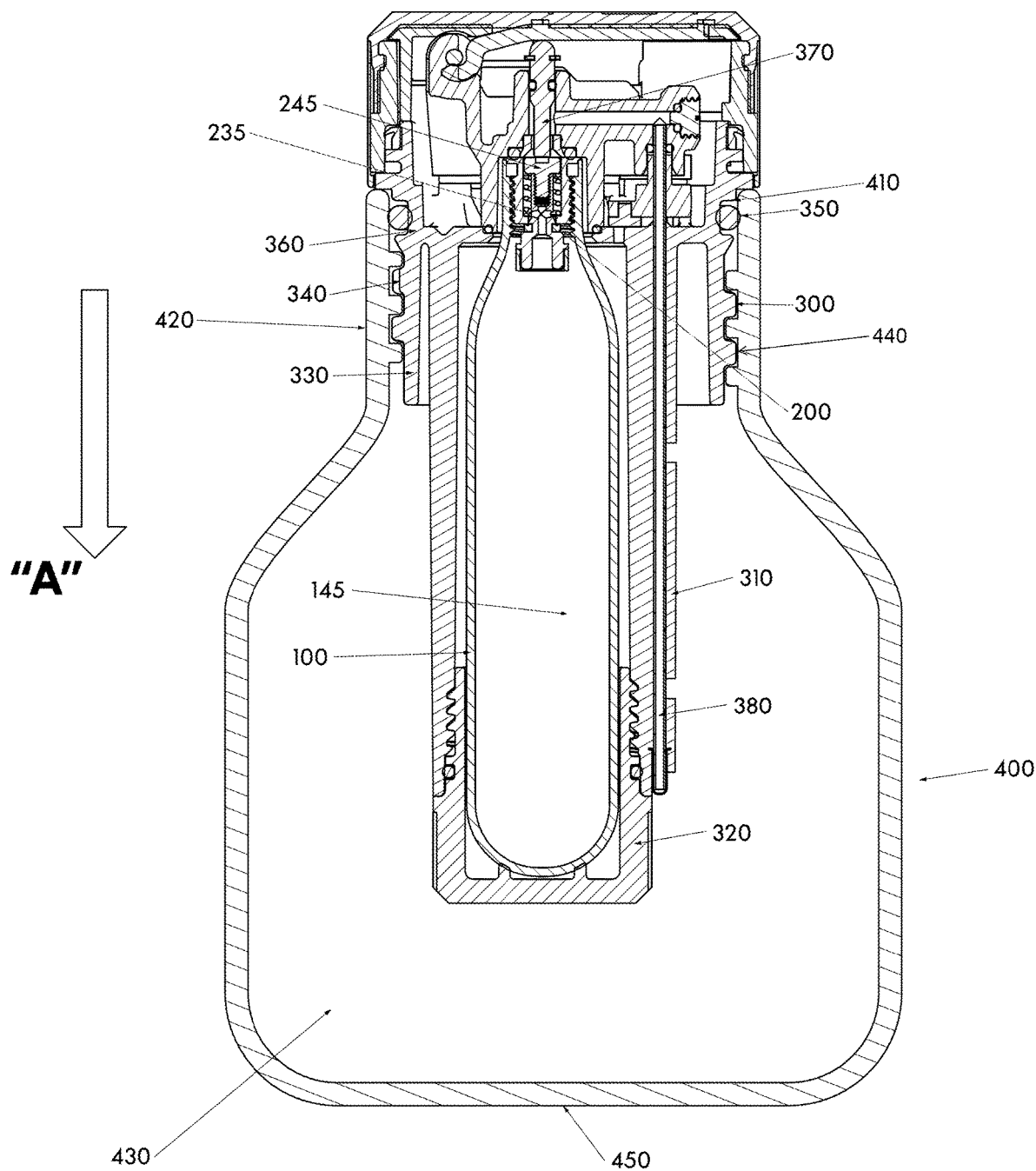
FIG. 12 is a cross-sectional view of the pressurizer, the cartridge, the valve, and the container, in accordance with some embodiments of the invention.

FIG. 10 is a perspective view of a pressurizer 300, in accordance with some embodiments of the invention. FIG. 11 is a front view of the pressurizer 300, in accordance with some embodiments of the invention. FIG. 12 is a cross-sectional view of the pressurizer 300 including the cartridge 100 and the valve 200, installed in a container 400, in accordance with some embodiments of the invention.

As shown in the figures, the pressurizer 300 may be installed within an opening of the container 400, so that at least a portion of the pressurizer 300 may be within a container interior 430 of the container 400. In some embodiments, the pressurizer 300 may be installed through a container opening 410 in a top end 420 of the container 400. In some embodiments, the container 400 may be filled with the fluid (e.g., the liquid) that is stored with the container interior 430 through the container opening 410 in the top end 420 of the container 400.

As discussed, in some embodiments, the container 400 may store the liquid within the container interior 430, such as a drinkable liquid. Also as discussed, in some embodiments, the pressurizer 300 may actuate the valve 200 installed in the cartridge 100, such as by moving the valve stem 245 of the valve 200 in the direction "A," thereby flowing the liquid, the gas, the pressurized liquid, and/or the pressurized gas stored within the cartridge interior 140 of the cartridge 100, from the cartridge 100, through the valve 200, into the liquid stored in the container interior 430 of the container 400. As further discussed, in some embodiments, the pressurizer 300 may actuate the valve 200 installed in the cartridge 100, flowing the liquid and/or the gas stored in the cartridge 100, from the cartridge 100, through the valve 200, into the liquid stored in the container interior 430 of the container 400, to pressurize the liquid stored in the container interior 430 of the container 400.

In some embodiments, the container 400 may be a bottle. In some embodiments, the container 400 may be a canteen. In some embodiments, the container 400 may be a thermos. In some embodiments, the container 400 may be insulated. In some embodiments, the container 400 may be uninsulated. In some embodiments, the container 400 may be made from a plastic material. In some embodiments, the container 400 may be made from a glass material. In some embodiments, the container 400 may be made from a metal material. In some embodiments, the metal material may be one or more of aluminum, iron, steel, stainless steel, titanium, and/or combinations of these and/or other metals. In some embodiments, the container 400 may be a combination of plastic, metal, and/or glass, with or without another material and/or other materials.

As shown in the figures, the pressurizer 300 may include a first pressurizer body 310. In some embodiments, the cartridge 100 may be installed within an opening of the first pressurizer body 310. In some embodiments, when the pressurizer 300 is installed in the container interior 430 of the container 400, the first pressurizer body 310 may be installed within the container interior 430 of the container 400. In some embodiments, the valve 200 may be installed in the cartridge 100, the cartridge 100 may include the liquid, the gas, the pressurized liquid, and/or the pressurized gas stored within the cartridge interior 140, and the cartridge 100 may be installed within the first pressurizer body 310 of the pressurizer 300. In some embodiments, the pressurizer 300 may include a cap 320 closing an end of the first pressurizer body 310. In some embodiments, the cap 320 may be removable for installation of the cartridge 100 within the first pressurizer body 310 of the pressurizer 300. In some embodiments, each of the cap 320 and the first pressurizer body 310 may include at least one thread, and the at least one thread of each of the cap 320 and the first pressurizer body 310 may threadingly engage with one another, thereby to secure the cap 320 to the first pressurizer body 310.

In some embodiments, the pressurizer 300 may include a second pressurizer body 330. In some embodiments, the second pressurizer body 330 may connect the pressurizer 300 with the container 400.

In some embodiments, the second pressurizer body 330 of the pressurizer 300 may include one or more pressurizer threads 340. In some embodiments, the pressurizer threads 340 may be sized, shaped, located, and/or dimensioned to threadingly engage one or more container threads 440 of the container 400. In some embodiments, the pressurizer threads 340 of the pressurizer 300 may threadingly engage the container threads 440 of the container 400, to impede flow of the liquid and/or the gas within the container 400, between the pressurizer 300 and the container 400.

In some embodiments, the pressurizer 300 may include a second sealing component 350. In some embodiments, when the pressurizer threads 340 threadingly engage the container threads 440 of the container 400, the second sealing component 350 may impede flow of the liquid and/or the gas stored within the container 400, between the pressurizer 300 and the container 400.

In some embodiments, the second sealing component 350 may be a gasket. In some embodiments, the second sealing component 350 may be an O-ring. In some embodiments, the second sealing component 350 may have a circular cross-section. In some embodiments, the second sealing component 350 may have a non-circular cross-section. In some embodiments, the second sealing component 350 may have an actuate cross-section. In some embodiments, the second sealing component 350 may have an elliptical cross-section. In some embodiments, the second sealing component 350 may be formed from an elastic material. In some embodiments, the second sealing component 350 may be formed from an inelastic material. In some embodiments, the second sealing component 350 may elastically deform when the pressurizer 300 is installed in the container 400. In some embodiments, the second sealing component 350 may plastically deform when the pressurizer 300 is installed in the container 400.

In some embodiments, the second sealing component 350 may be installed in a pressurizer groove 360 in the second pressurizer body 330. In some embodiments, at least a portion of the pressurizer groove 360 may have a circular cross-section. In some embodiments, at least a portion of the pressurizer groove 360 may have a non-circular cross-section. In some embodiments, at least a portion of the pressurizer groove 360 may have an arcuate cross-section. In some embodiments, at least a portion of the pressurizer groove 360 may have an elliptical cross-section. In some embodiments, at least a portion of a cross-section of the pressurizer groove 360 may be the same as at least a portion of a cross-section of the second sealing component 350. In some embodiments, at least a portion of a cross-section of the pressurizer groove 360 may be different from at least a portion of a cross-section of the second sealing component 350.

In some embodiments, the pressurizer 300 may include an actuator 370. In some embodiments, application of a force beyond a predetermined threshold (that is, actuation) of the actuator 370 may move the valve stem 245 of the valve in the direction "A," thereby moving the valve stem 245 to the "open" position and opening the valve 200. In some embodiments, the liquid, the gas, the pressurized liquid, and/or the pressurized gas stored within the cartridge interior 140 of the cartridge 100 may flow from the cartridge interior 140 of the cartridge 100, though the first flow path 235 of the valve interior 240, into the liquid stored in the container interior 430 of the container 400. In some embodiments, a sufficient amount of the pressurized liquid and/or gas in the cartridge interior 140 of the cartridge 100 flows into the liquid stored in the container interior 430 of the container 400, so that the liquid stored in the container interior 430 is pressurized.

In some embodiments, the pressurizer 300 includes a third flow path 380. In some embodiments, the first pressurizer body 310 may include the third flow path 380. As shown in the figures, the third flow path 380 may have an exit at a lower end of the first pressurizer body 310. In some embodiments, when the valve stem 245 is actuated by the actuator 370 (that is, when the valve 200 is opened by moving the valve stem 245 in the direction "A"), the liquid, the gas, the pressurized liquid, and/or the pressurized gas stored within the cartridge interior 140 of the cartridge 100, flows from the cartridge interior 140, through the first flow path 235 of the valve interior 240, though the third flow path 380 of the pressurizer 300, and into the container interior 430 of the container 400. As discussed, in some embodiments, the container interior 430 of the container stores a fluid, such as a liquid, and such as a drinkable liquid. In some embodiments, the exit of the third flow path 380 of the pressurizer 300 is lower than an uppermost surface of the liquid that is stored in the container interior 430 of the container 400. Thus, in some embodiments, a pressurized liquid and/or pressurized gas in the cartridge interior 140 of the cartridge 100 flows into the liquid stored in the container interior 430 of the container 400, thereby pressurizing the liquid stored in the container interior 430 of the container 400.

In some embodiments, a user of the pressurizer 300 may install the valve 200 in the cartridge 100. In some embodiments, the valve 200 may be installed in the cartridge 100 prior to the user acquiring the pressurizer 300 and/or the cartridge 100. In some embodiments, the user of the pressurizer 300 may install the cartridge 100 that includes the valve 200, and which includes the liquid, gas, pressurized liquid, and/or pressurized gas within the cartridge interior 140 of the cartridge 100, into the pressurizer 300. In some embodiments, the cartridge 100 including the valve 200 may be installed in the pressurizer 300 prior to the user acquiring the pressurizer 300. In some embodiments, the user may fill the container interior 430 of the container 400 with a liquid, such as a drinkable liquid. In some embodiments, the user may install the pressurizer 300 in the container 400. In some embodiments, the user may actuate the actuator 370, thereby flowing the liquid, the gas, the pressurized liquid, and/or the pressurized gas from the cartridge 100 into the liquid stores in the container 400. Thus, in some embodiments, when the cartridge 100 includes a pressurized liquid and/or gaseous carbon dioxide in the cartridge interior 140, the user may carbonate the liquid stored in the container interior 430 of the container 400.

In some embodiments, the user may remove the pressurizer 300 from the container 400, thereby to access the liquid stored in the container interior 430 of the container 400, such as, for example, to drink the liquid. In some embodiments, the user may remove the pressurizer 300 from the container 400, thereby to access the liquid stored in the container interior 430 of the container 400 that is mixed with the liquid and/or the gas from the cartridge 100 (that is, to access a mixture of the liquids and/or the gases).

As shown in the figures, in some embodiments, when the pressurizer 300 is installed in the container 400, the valve 200 in the cartridge 100, which is installed in the pressurizer 300, is proximate or adjacent to the top end 420 of the container 400, and distal or away from a bottom end 450 of the container 400 which is opposite the top end 420.

As shown in the figures, in some embodiments, when the pressurizer 300 is installed in the container 400, and the valve 200 is installed in the cartridge 100, the first flow path 235 may extend in a first direction, the second flow path 280 may extend in a second direction, and the third flow path 380 may extend in a third direction. In some embodiments, any of the first, second, and third directions may be the same as any other of the first, second, and third directions. In some embodiments, any of the first, second, and third directions may be the same as any other of the first, second, and third directions. In some embodiments, the first and second directions may be the same as each other, and may be different than the third direction. In some embodiments, at least a portion of the third direction may be opposite to the first direction and/or the second direction.

In some embodiments, the invention may provide one or more methods, in which any or all of, and/or one or more other components, are obtained, including but not limited to the container 400, the pressurizer 300, the valve 200, and/or the cartridge 100, and/or any of the elements of the container 400, the pressurizer 300, the valve 200, and/or the cartridge 100.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A method of mixing fluids, comprising:
obtaining a cartridge having a first fluid within an interior of the cartridge,
wherein the cartridge includes a valve disposed within an interior of the cartridge,
wherein the valve comprises:
a valve housing,
a valve stem,
wherein the valve stem is movable within the valve housing to open and close a first flow path,
an annular component, and
a valve disk,
wherein the valve disk is configured to rupture when exposed to a predetermined pressure that results in the first fluid within the interior of the cartridge flowing through the ruptured valve disk and through the first flow path, and
wherein the valve disk comprises a cup shape with a first surface and a second surface,
wherein the first surface is exposed to the first fluid within the interior of the cartridge,
wherein the second surface extends perpendicular to the first surface,
wherein the second surface is positioned between a sidewall of the annular component and a sidewall of the valve stem;
obtaining a container having a second fluid within an interior of the container;
obtaining a pressurizer,
wherein the pressurizer defines a second flow path;
installing the cartridge within the pressurizer;
installing the pressurizer within a container opening at a top end of the container; and
moving the valve stem of the valve in a first direction to open the valve in the cartridge, to thereby flow the first fluid within the interior of the cartridge through the first flow path in the valve, and through the second flow path in the pressurizer, and then into the second fluid in the interior of the container, to thereby pressurize the second fluid by mixing the first fluid with the second fluid.

2. The method of claim 1, wherein the valve is proximate the top end of the container.

3. The method of claim 1, wherein the first fluid comprises a first pressurized gas.

4. The method of claim 3, wherein the first pressurized gas comprises carbon dioxide.

5. The method of claim 4, wherein the second fluid comprises a beverage.

6. The method of claim 1, further comprising:
removing the pressurizer from the container opening at the top end of the container, to thereby provide access to a mixture of the first fluid and the second fluid in the interior of the container.

7. The method of claim 1, wherein the installing the pressurizer further comprises:
engaging threads of the pressurizer with threads of the container.

8. The method of claim 1, wherein the container comprises a thermos, bottle, or canteen.

9. The method of claim 1,
wherein at least a portion of the first flow path extends in a first direction,
wherein at least a portion of the second flow path extends in a second direction,
wherein the first direction is different than the second direction.

10. The method of claim 9, wherein the first direction is opposite the second direction.

11. A method of mixing fluids, comprising:
obtaining a cartridge,
wherein the cartridge comprises:
a cartridge body; and
a cartridge neck,
wherein the cartridge body comprises a cartridge interior storing a first fluid,
wherein the cartridge neck includes a valve,
wherein the valve comprises:
a valve housing,
a valve stem,
wherein the valve stem is movable within the valve housing to open and close a first flow path,
an annular component, and
a valve disk,
wherein the valve disk is configured to rupture when exposed to a predetermined pressure that results in the first fluid within the interior of the cartridge flowing through the ruptured valve disk and through the first flow path, and
wherein the valve disk comprises a cup shape with a first surface and a second surface, wherein the first surface is exposed to the first fluid within the interior of the cartridge,
wherein the second surface extends perpendicular to the first surface,
wherein the second surface is positioned between a sidewall of the annular component and a sidewall of the valve stem;
obtaining a container,
wherein the container comprises a container interior storing a second fluid;
obtaining a pressurizer,
wherein the pressurizer comprises a pressurizer body,
wherein the pressurizer body defines a third second flow path;
installing the cartridge within the pressurizer body;
installing the pressurizer within a container opening at a top end of the container; and
moving the valve stem of the valve in a first direction to open the valve in the cartridge, to thereby flow the first fluid within the cartridge interior through the first flow path in the valve, and through the second flow path in the pressurizer, and then into the second fluid in the interior of the container, to thereby pressurize the second fluid by mixing the first fluid with the second fluid.

12. The method of claim 11,
wherein the cartridge neck comprises a first thread,
wherein the valve comprises a second thread,
wherein the first thread and the second thread engage with one another.

13. The method of claim 12, wherein the valve stem further comprises a valve seat,
wherein the valve seat is movable between
a first position that closes the first flow path, and
a second position that opens through the first flow path.

14. The method of claim 13, wherein the valve further comprises a spring, wherein the spring biases the valve seat toward the first position.

15. The method of claim 14, wherein the method further comprises:
removing the pressurizer from the container, to thereby provide access to a mixture of the first fluid and the second fluid.

16. The method of claim 11, wherein the installing the cartridge within the pressurizer further comprises:
installing a cap on an end of the pressurizer body.

17. The method of claim 16, wherein threads of the cap engage with threads of the pressurizer body.

18. The method of claim 14, wherein the installing the pressurizer further comprises engaging threads of the pressurizer with threads of the container.

19. The method of claim 11, wherein the valve further comprises a sealing component, wherein the sealing component impedes flow between an exterior surface of the valve and an interior surface the cartridge.

20. The method of claim 11, wherein the valve is proximate the top end of the container.

21. The method of claim 11, wherein the first fluid comprises a first pressurized gas.

22. The method of claim 21, wherein the first fluid pressurizes the second fluid in the container.

23. The method of claim 22, wherein the first pressurized gas comprises liquid and/or gaseous carbon dioxide.

24. The method of claim 11, further comprising:
removing the pressurizer from the container opening at the top end of the container, to thereby provide access to a mixture of the first fluid and the second fluid in the container.

25. The method of claim 11, wherein the installing the pressurizer further comprises:
engaging threads of the pressurizer with threads of the container.

26. The method of claim 11, wherein the container comprises a thermos, bottle, or canteen.

27. The method of claim 11, wherein the second fluid comprises a beverage.

28. The method of claim 11,
wherein at least a portion of the first flow path extends in a first direction,
wherein at least a portion of the second flow path extends in a second direction,
wherein the first direction is different than the second direction.

29. The method of claim 28, wherein the first direction is opposite the second direction.

* * * * *